United States Patent
Norum et al.

(12) 
(10) Patent No.: US 11,102,254 B2
(45) Date of Patent: Aug. 24, 2021

(54) STREAMED COMMUNICATIONS

(71) Applicant: Cyviz AS, Sandnes (NO)

(72) Inventors: Fredrik Norum, Stavanger (NO); Marius Skadberg, Sola (NO); Eirik Simonsen, Stavanger (NO)

(73) Assignee: Cyviz AS, Sandnes (NO)

( * ) Notice: Subject to any disclaimer, the term of this patent is extended or adjusted under 35 U.S.C. 154(b) by 11 days.

(21) Appl. No.: 16/308,670

(22) PCT Filed: Jun. 8, 2017

(86) PCT No.: PCT/GB2017/051670
§ 371 (c)(1),
(2) Date: Dec. 10, 2018

(87) PCT Pub. No.: WO2017/212279
PCT Pub. Date: Dec. 14, 2017

(65) Prior Publication Data
US 2019/0166169 A1    May 30, 2019

(30) Foreign Application Priority Data

Jun. 8, 2016  (GB) .................................. 1609986

(51) Int. Cl.
*G06F 15/16* (2006.01)
*H04L 29/06* (2006.01)
(Continued)

(52) U.S. Cl.
CPC ........ *H04L 65/403* (2013.01); *H04L 12/2838* (2013.01); *H04L 12/4625* (2013.01); *H04L 63/0838* (2013.01); *H04L 65/608* (2013.01)

(58) Field of Classification Search
CPC . H04L 65/403; H04L 65/608; H04L 12/2838; H04L 12/4625; H04L 63/0838
See application file for complete search history.

(56) References Cited

U.S. PATENT DOCUMENTS

| 8,909,704 B2 | 12/2014 | Flannagan et al. |
| 9,032,461 B2 | 5/2015 | Tucker et al. |

(Continued)

FOREIGN PATENT DOCUMENTS

| CN | 101141485 | 3/2008 |
| CN | 101287014 | 10/2008 |
| WO | 2012065554 | 3/2011 |

*Primary Examiner* — Richard G Keehn
(74) *Attorney, Agent, or Firm* — Diederiks & Whitelaw, PLC

(57) ABSTRACT

In a system for streaming data comprising multimedia content, one or more controllers comprising a controller interface are arranged to be connected to an end-user device via a first control network link. One or more multimedia receiver devices comprise a multimedia interface suitable for connection to a video reception device. Each of the one or more multimedia receiver devices is arranged to be connected to an associated controller via a second control network link and is further arranged to be directly connected to the end-user device via a media streaming network link. A control server hosts a list of the one or more multimedia receiver devices and associated controllers. The end-user device comprises a user interface connected to the control server. The system provides for the selection of a multimedia receiver device from the list and the user interface is arranged for selection of the multimedia content to be streamed. The end-user device and the controller associated with the selected multimedia receiver device are arranged to initiate a media streaming session via the media streaming network link between the end-user device and the selected multimedia receiver device upon receiving a user input via the controller interface or via the end-user device.

20 Claims, 16 Drawing Sheets

(51) Int. Cl.
*H04L 12/46* (2006.01)
*H04L 12/28* (2006.01)

(56) References Cited

U.S. PATENT DOCUMENTS

| | | | |
|---|---|---|---|
| 9,179,097 | B2 | 11/2015 | Kuscher et al. |
| 9,232,191 | B2 | 1/2016 | Periyannan et al. |
| 9,398,056 | B2 | 7/2016 | Saxena et al. |
| 9,467,650 | B2 | 10/2016 | Jing et al. |
| 9,621,603 | B2 | 4/2017 | Vadla Ravnas |
| 9,710,142 | B1* | 7/2017 | Vendrow ............... H04L 65/403 |
| 9,781,385 | B2 | 10/2017 | Ma et al. |
| 2005/0134682 | A1 | 6/2005 | Sandler et al. |
| 2009/0228808 | A1 | 9/2009 | MacDonald et al. |
| 2011/0271129 | A1 | 11/2011 | Flannagan et al. |
| 2011/0271332 | A1 | 11/2011 | Jones et al. |
| 2014/0317532 | A1 | 10/2014 | Ma et al. |
| 2015/0095933 | A1 | 4/2015 | Blackburn et al. |
| 2016/0227161 | A1* | 8/2016 | Jing ...................... H04L 65/403 |
| 2017/0244767 | A1* | 8/2017 | Jana ...................... H04L 65/403 |
| 2017/0264446 | A1* | 9/2017 | Rose ........................ H04M 3/56 |
| 2017/0264676 | A1* | 9/2017 | Rajamani ............... H04W 84/12 |
| 2017/0269894 | A1* | 9/2017 | Lawrence ............. G06F 3/1454 |
| 2017/0272512 | A1* | 9/2017 | Pai ..................... H04L 67/1002 |
| 2018/0234978 | A1* | 8/2018 | Shao ..................... H04W 72/02 |

\* cited by examiner

STREAMED COMMUNICATIONS

CROSS-REFERENCE TO RELATED APPLICATIONS

This application represents the U.S. National Phase of International Application number PCT/DE2017/051670 entitled "Streamed Communications" filed 8 Jun. 2017, which claims priority from and the benefit of United Kingdom patent application No. 1609986.3 filed on 8 Jun. 2016, all of which are incorporated herein by reference.

BACKGROUND OF THE INVENTION

The present invention relates to a system and method for streaming data, particularly multimedia content, from one device to another.

It is common during business meetings for a presenter to make his/her computer screen visible to all of the participants, using e.g. a projector, a large external monitor or an interactive whiteboard. It is also becoming increasingly common for meetings and conferences that would have once necessitated all participants to be in the same room to now be carried out remotely using web conferencing systems.

When a presenter wishes to display multimedia content on an external monitor, they are faced with a number of options of how to do so. The most common solution is to use a cable to physically connect an external monitor to the presenter's device, such as a high-definition multimedia interface (HDMI®), video graphics array (VGA), digital visual interface (DVI) cable, or other similar type of multimedia format. However, the Applicant has appreciated that there are problems with this approach, such as the cable being limited in length, potentially difficult to connect to the device and that it requires the presenter's device to be physically located nearby. The Applicant has also appreciated that many modern devices have working lifetimes that may far exceed the lifetime of a connector standard such as HDMI®, VGA or DVI and thus may not be compatible with the available cable connector.

Alternative network-centric streaming solutions are also available, such as the Chromecast™ made by Google® or the Apple TV® made by Apple®. However, these solutions do not offer the level of scalability that is required in business contexts and require specific software support such as Apple® Airplay®. However, the systems described above known in the art per se, do not have a sufficiently robust method of ensuring that the content is being streamed to the correct location when a number of different receiving devices may be available. This problem is referred to herein as the "proximity detection challenge".

There are also browser-to-browser solutions such as Cisco WebEx®, where the presenter and participants partake in the meeting using their web browsers or dedicated proprietary software. However, this still requires a computer or similar device connected to the external display in some manner to have a browser or the dedicated proprietary software running to connect to the web meeting session. Setting up such a system may require more user intervention than is necessary, making connecting to the session complicated and frustrating to users. Also, the above referenced systems known in the art per se do not provide a way of ensuring that the content is being streamed to the correct location.

SUMMARY OF THE INVENTION

The Applicant has appreciated that it would be useful to have a system that required minimal setup and ensures that multimedia content is streamed to the correct destination.

Thus when viewed from a first aspect, the present invention provides a system for streaming data comprising multimedia content, the system comprising:

one or more controllers comprising a controller interface arranged to be connected to an end-user device via a first control network link;

one or more multimedia receiver devices comprising a multimedia interface suitable for connection to a video reception device, wherein each of the one or more multimedia receiver device(s) is arranged to be connected to an associated controller via a second control network link and is further arranged to be directly connected to the end-user device via a media streaming network link;

a control server hosting a list of the one or more multimedia receiver device(s) and associated controller(s);

wherein the end-user device comprises a user interface connected to the control server, said user interface being arranged for the selection of a multimedia receiver device from the list and the multimedia content to be streamed;

wherein the end-user device and the controller associated with the selected multimedia receiver device are arranged to initiate a media streaming session via the media streaming network link between the end-user device and the selected multimedia receiver device upon receiving a user input via the controller interface or via the end-user device.

Thus it will be appreciated by those skilled in the art that the present invention provides a multimedia streaming system wherein the media streaming network link between the end-user device (the source of the multimedia content to be streamed) and the selected multimedia receiver (the destination of said multimedia content) provides an independent network link therebetween, wherein the establishment of the media streaming network link is controlled by a separate controller having its own control network links to the end-user device and the selected multimedia receiver device. The selected multimedia receiver device can thus receive the streamed data, and subsequently convert it e.g. to a video signal for output to the external video reception device.

Moreover, in accordance with the present invention, the presenter can, using the end-user device, select or search for a target receiver device to which he or she wishes to stream multimedia content of his/her choice using the user interface and its connection to the control server. The list indicates which of the controllers is connected to one or more given multimedia receiver device(s) (i.e. "associated") via a second control network link. For example, a controller in each meeting room may be connected (or connectable) to the multimedia receiver device(s) in that same room. The list may also contain further information about the controllers and associated multimedia receiver devices, for example giving the receivers user friendly nicknames such as "Conference Room 1" or "Lecture Theatre", to make it easier for the presenter to select or find the correct multimedia receiver device and associated controller.

It will be understood that the term "selection" or "selecting" as used herein is not limited to making a manual selection of a particular multimedia receiver device within the list (e.g. by clicking a button or link within a graphical user interface) but extends to other methods of selection that may be hidden from the user. For example, the selection of the multimedia receiver device and associated controller may take place "behind the scenes" from the perspective of the user. As will be described in further detail below, the user may be presented with an "access code" that, when entered into the end-user device, allows the system to connect the end-user device to the appropriate controller and to be confident that the user is proximate to the intended multimedia receiver device and associated controller (or is authorised to stream thereto—e.g. by being provided with the access code "out-of-channel" by email, telephone call or the like).

The controller associated with the selected multimedia receiver device only permits the establishment of the media streaming network link once it receives confirmation from a user (i.e. the user input). In some embodiments, the user input comprises a first confirmation that the media streaming network link should be established with the selected multimedia receiver device. This advantageously ensures that the point-to-point media streaming link takes place between the correct devices. For example, if a presenter or some other participant within a meeting room wished to share their screen with everyone else within the room (e.g. to give a presentation), they can simply use their own personal device such as a laptop or tablet as an end-user device to obtain the list of receivers from the control server, select a receiver within the room they are currently in, confirm their presence using the controller interface and then share their screen with an external display such as a large monitor or projector within the room.

Similarly, if a remote user wished to stream content from the end-user device located in one room e.g. a personal office, to a particular conference room, the controller interface may, by way of example only, display a message to one or more local users within the conference room and request they confirm whether they wish to receive the stream from that particular remote user by performing the required user input, e.g. pressing a button on the controller interface.

While the media streaming session may be initiated subject only to confirmation at the controller interface that the multimedia receiver device should receive the streamed data, in some embodiments, the end-user device and the controller associated with the selected multimedia receiver device are arranged only to initiate the media streaming session upon a second confirmation being entered into the end-user device via the user interface. In some embodiments, the second confirmation comprises an access code. For example, an access code may comprise a personal identification number (PIN) code or an alphanumeric passphrase which is to be entered into the end-user device via the user interface. In some such embodiments, the second confirmation is transmitted from the end-user device to the controller via the first control network link. This essentially provides mutual authentication, such that both parties can be sure that the media streaming session should go ahead. This advantageously prevents a situation in which the presenter selects an incorrect multimedia receiver device by accident and an unintended recipient confirms that they wish to receive the stream. This could have negative consequences such as sensitive information being presented to the wrong audience.

In some embodiments, the access code is generated by a server, which may be the control server as described above. This allows the control server to generate unique or one-time authorisation (OTA) codes or "quick codes" that prevent re-use, thus increasing the security of the system. These access e.g. OTA codes may, at least in some embodiments, be presented either on a display connected to the multimedia receiver or via a display of the controller interface such that the user can obtain a generated access code e.g. one-time authorisation code and enter it into the end-user device. This provides a means of proximity detection for a multimedia receiver and its associated controller in a particular room. The user may obtain the access e.g. OTA code simply by looking at the display if he or she is physically present within the room or may be provided with the code by another participant within the room, for example via an email or by telephone. The user may then enter the access code via the user interface (e.g. using a web application) and, subject to verification, the appropriate multimedia receiver device is selected from the list hosted by the control server and access is given for multimedia content to be streamed to the relevant room. In some such embodiments, the list hosted by the control server comprises a list of current access codes e.g. a one-time authorisation code for each of the one or more multimedia receiver device(s) and associated controller(s). In such embodiments, the user may not have to select the desired receiver manually from the list but by simply entering a currently valid access e.g. OTA code, the server can "map" this code to a particular receiver and establish the multimedia streaming network link "in the background" without any need for the user to locate the receiver within the list themselves. The server (e.g. control server as described above) may provide a centralised repository with an aggregated overview of access codes issued to rooms, the controller(s) in each room and the receiver(s) associated with each controller.

Accordingly, various embodiments of the present invention advantageously implement a proximity detection mechanism which prevents a situation in which the presenter selects and streams content to an incorrect multimedia receiver device intentionally or by accident. This could have negative consequences such as sensitive information being presented to the wrong audience or meetings being interrupted.

While the system described above could be used for two-way (i.e. half- or full-duplex) communications, the Applicant has appreciated that the system described hereinabove is particularly suited to applications such as web conferencing and screen sharing and thus in preferred embodiments the media streaming session is simplex. By way of contrast, the first and second control network links are preferably two-way communications (i.e. they provide half- or full-duplex communications).

It will be appreciated that providing the media streaming network link and/or the first control network link allows for flexibility in the proximity between the end-user device and the multimedia receiver device. In some embodiments the media streaming network link and/or the first control network link comprises a local area network (LAN). In alternative embodiments, the media streaming network link and/or the first control network link comprises a virtual private network (VPN). In some further alternative embodiments, the media streaming network link and/or the first control network link comprises an Internet connection. For installations wherein the media is to be streamed locally, perhaps from within the same room or building, a LAN such as a wired network or wireless LAN may provide the necessary network connectivity. By way of contrast, if a webconference is desired between different offices within a company or between a company and e.g. a client, a VPN or Internet-based connection may be more appropriate.

While the user interface could be, for example, provided by a standalone computer program, in preferred embodiments the user interface comprises a web browser. The end-user device can thus use a web browser to navigate to a particular Uniform Resource Locator (URL)—i.e. a web address—within a pre-existing web browser such as Firefox®, Opera™, Internet Explorer®, Chrome™, or Edge™. In some such embodiments, the web browser is arranged to implement the initiated media streaming session using a web application hosted by the control server. In such embodiments, the control server may provide the list of receivers and associated controllers to the web application to enable a user to identify a desired multimedia receiver. Preferably the web browser is arranged to implement the initiated media streaming session using a Web Real-Time Communication (WebRTC) application programming interface (API). The WebRTC technology standard is defined by the World Wide Web Consortium (W3C®) and provides for real-time, browser-to-browser communications via simple APIs. The Applicant has appreciated that WebRTC provides a platform agnostic mechanism for streaming from any web browser that supports it. The multimedia receiver device can then receive the WebRTC stream and directly convert it to a video stream before transmitting it via the multimedia interface to the video reception device. The user interface may comprise any suitable WebRTC-compliant browser that supports a method of capturing the desired content on the end-user device in order for it to be streamed using WebRTC. It will of course be appreciated that while WebRTC is one media streaming protocol that is readily available, the principles of the present invention outlined herein are applicable to other media streaming protocols.

However, while it is less preferred to provide the user interface using a standalone computer program, the Applicant has appreciated that there are circumstances wherein this is unavoidable, for example due to security or software compatibility concerns. It is thus foreseen that, at least in some embodiments, the user interface may comprise a standalone computer program that supports the WebRTC protocol.

While the end-user device could host a local list of known multimedia receivers and associated controllers (i.e. the end-user device comprises the control server), in preferred embodiments the control server comprises a remote server arranged to be connected to the end-user device via a server network link. This provides a centrally located, managed directory of all known receivers and associated controllers that can be accessed via any suitable end-user device, and thus the end-user devices advantageously require no prior knowledge of the system. However, in some such embodiments, the end-user device hosts a local list of known multimedia receivers and associated controllers. The local list hosted by the end-user device may be a subset of the list hosted by the control server and may, by way of example only, comprise a list of recently used multimedia receivers or a list of "favourite" multimedia receivers (e.g. those used most often by the user).

It will be appreciated by those skilled in the art that there are a number of multimedia interfaces known in the art that could be readily applied to the present invention such as video graphics array (VGA) or digital visual interface (DVI). However, in at least some preferred embodiments the multimedia interface comprises a high-definition multimedia interface (HDMI®). In at least some other preferred embodiments, the multimedia interface comprises a display port interface. The HDMI® and display port interfaces are capable of providing video data at relatively high resolutions as well as carrying sound data. However, it should be understood that the present invention is applicable to other multimedia interfaces not explicitly listed herein and the multimedia receiver device may use any kind of video output format.

The second control network link, which is preferably independent from the first control network link, provides for communications signals to be sent from the controller to the associated multimedia receiver device, wherein such signals could include notifications that an incoming media streaming session is to be established or could include parameters necessary for the establishment of said media streaming session. In some embodiments, the second control network link comprises a local area network (LAN). In some embodiments, the second control network link comprises a wireless local area network (WLAN or Wi-Fi®). In some alternative embodiments, the second control network link comprises a Bluetooth® connection, which might be a Bluetooth® Smart connection.

While the controller could be e.g. a computer terminal connected to the receiver device, in some embodiments the controller interface comprises a standalone control panel. This standalone control panel can then be located at a convenient location in e.g. a conference room such that media streaming sessions can be set up with relative ease.

In some embodiments, the system comprises a third control network link between the end-user device and the multimedia receiver device. Preferably said third control network link is also established by the controller device, via the first and second control network links. This additional control network link provides the ability for control signals to be passed directly between the end-user device and the multimedia receiver device without needing to relay the signals via the controller. It will be appreciated that this third control network link is not involved in transmission of the media streaming session.

Thus it will be seen that the end-user device, the controller (s), the multimedia receiver device(s) and the control server can all be connected to one another via a control network. This control network comprises a plurality of control network links as described hereinabove arranged such that each node within the control network can communicate with any other node via the connections of the control network, even if the two nodes are not directly connected to one another. A separate relay service may be provided for the transmission of the media stream such that the stream may continue in case a direct link between the end-user device and the receiver device cannot be established.

In various embodiments, the multimedia receiver device comprises at least one multimedia interface. The multimedia receiver device may optionally be arranged for connection to multiple video reception devices, using one or more multimedia interfaces. The or each video reception device may comprise a single display panel or multiple panels in an array, for example a display wall.

While the system may be used to stream the multimedia data to a single multimedia receiver device, in some embodiments the system comprises a plurality of multimedia receiver devices each comprising a multimedia interface suitable for connection to a video reception device, wherein each multimedia receiver device has a dedicated media streaming network link to the end-user device. It will of course be appreciated that the media streaming protocol used in such embodiments must also support streaming content to a plurality of receivers. In such embodiments, the end-user device can stream multimedia content to a number of different external displays simultaneously. In some such embodiments, at least two multimedia receiver devices have dedicated control network links to the same controller. This allows multiple external displays that are in close proximity to one another to share a controller, reducing the number of components required for such an installation.

In some embodiments, the system further comprises a matrix device comprising a plurality of multimedia interface inputs and at least one multimedia interface output, the matrix device being connected between the plurality of multimedia receiver devices and their associated controllers, wherein the matrix device is arranged to route media content streamed over each media streaming network link to the video reception device. In some such embodiments, each of the plurality of multimedia receiver devices is arranged to send an incoming stream signal to its associated controller upon receiving streamed media content from the end-user device, and the associated controller is arranged to send a matrix switch signal to the matrix device upon receiving the incoming stream signal, wherein the matrix device is arranged to route media content streamed over each media streaming network link to the video reception device upon receiving the matrix switch signal. In at least some such embodiments, the matrix device is arranged to route media content streamed over a plurality of media streaming network links to a plurality of virtual windows displayed on the video reception device. Additionally or alternatively, in at least some embodiments the matrix device is arranged to route media content streamed over a plurality of media streaming network links to different video reception devices.

In some alternative embodiments, the system further comprises a plurality of controllers, wherein each multimedia receiver device has a dedicated second control network link to a different controller. Such embodiments allow for flexibility in the placement of the multimedia receiver devices as they may not be as constrained in terms of proximity to a single controller. It will be understood that multimedia content may include at least one of: video data, audio data, media data or other interactive content. What is meant by "streaming data" is a one-way transmission of data comprising multimedia content.

Preferably, the controller is physically separate from the multimedia receiver device. For example, the multimedia receiver device may be physically connected to the video reception device via a cable but the controller is standalone, e.g. elsewhere in the same room. While the controller could be physically fixed at a particular location, in preferred embodiments the controller is portable. As previously discussed, in preferred embodiments the end-user device is located within the same room as the controller and the receiver.

When viewed from a second aspect, the present invention provides a method of streaming data comprising multimedia content from an end-user device having a user interface to a multimedia receiver device comprising a multimedia interface suitable for connection to a video reception device, the method comprising:

connecting the user interface of the end-user device to a server to access a list of one or more multimedia receiver device(s) and associated controller(s);

selecting one or more multimedia receiver(s) from the list via the user interface;

transmitting a stream request via a first control network link between the end-user device and a controller, having a controller interface, that is associated with the selected multimedia receiver device;

receiving a user input via the controller interface or via the end-user device to accept the stream request;

transmitting an initiation command from the controller to the selected multimedia receiver device via a second control network link;

selecting the multimedia content to be streamed via the user interface; and initiating a media streaming session via a media streaming network link between the end-user device and the multimedia receiver device.

In some embodiments, the method further comprises displaying the multimedia content using a video reception device connected to the multimedia interface.

According to various further embodiments of the present invention, such a method may include any of the features described hereinabove.

As described hereinabove, the media streaming session may be initiated either partially or completely automatically (i.e. without the user needing to manually select a multimedia receiver device from the list), for example using an access code that the server can map to a particular receiver and overcome the proximity detection challenge at the same time. The Applicant has devised some further ways to provide for user proximity detection and enable automatic selection of an appropriate multimedia receiver device from the list.

In some potentially overlapping embodiments of either of the foregoing aspects, the system further comprises a user location system arranged to provide user location information to the control server. This means that user location information (e.g. as to the actual whereabouts of a user) may be used by the control server when initiating the media streaming network link, for example to determine which multimedia receiver(s) should be available for the selection of a multimedia device from the list. For example, the control server may use the user location information to determine that a user is in a particular building, section of building, room, or on a particular floor of a building, which may narrow the list of viable multimedia receivers. In some preferred embodiments, the selection of a multimedia receiver device from the list is carried out automatically at least partially based on the user location information.

As the user location system may provide a trusted source of location information as to the whereabouts of users, it may not be necessary in such embodiments to carry out any further confirmation steps (e.g. inputting access codes as described hereinabove), though these may of course still be carried out optionally if desired in order to provide an additional layer of security.

The user location system may be completely separate to the control server and connected via a suitable location information network link. In at least some embodiments, the user location system is arranged to receive user location information from one or more beacons that can determine a user's physical location. These beacons may form part of an indoor positioning system where the one or more beacons are located throughout a physical area such as a workplace (e.g. throughout an office building or campus) and users carry an identification (ID) tag that can be read by the beacon(s) in order to determine where the users are at a given point in time.

In some potentially overlapping embodiments of either of the foregoing aspects, the system further comprises a scheduling server arranged to provide meeting information to a (or each) controller of the one or more controllers. The meeting information may include information corresponding to one or more users invited to a meeting in a room where the controller is located. In preferred embodiments, a controller is arranged to pull meeting information from the scheduling server. The controller may intermittently or continuously request meeting information that includes a room booking for the room where the controller is located. This means that the controller does not need access to users' calendars stored in the scheduling server. Preferably, only the meeting information that is relevant to a given controller is provided by the scheduling server.

In a preferred set of embodiments, the system is arranged to use the meeting information when providing for the selection of a multimedia receiver device from the list. The controller may be arranged to send meeting information to the control server via a network link. The control server may be arranged to aggregate the meeting information with the list of the one or more multimedia receiver device(s) and associated controller(s). Thus, in accordance with such embodiments, advance meeting information can be used by the controller and/or control server when initiating a media streaming session. In some preferred embodiments, the selection of a multimedia receiver device from the list is carried out automatically at least partially based on the meeting information. For example, when a user who has been invited to a meeting confirms his/her presence at a controller in a particular meeting room (e.g. by logging in or by any suitable form of personal identification, e.g. ID card reader, fingerprint reader, etc.), and an end-user who has been invited to the same meeting connects his/her end-user device to the control server, an appropriate multimedia receiver device for the associated controller may be automatically selected. Either of the users may enter a user input, via the controller interface or the end-user device, to initiate the media streaming session. Proximity detection is provided by the advance meeting information about the meeting participants.

Using meeting information in order to select the multimedia receiver device is considered novel and inventive in its own right, and thus when viewed from a third aspect, the present invention provides a system for streaming data comprising multimedia content, the system comprising:

one or more controllers comprising a controller interface arranged to be connected to an end-user device via a first control network link;

one or more multimedia receiver devices comprising a multimedia interface suitable for connection to a video reception device, wherein each of the one or more multimedia receiver device(s) is arranged to be connected to an associated controller via a second control network link and is further arranged to be directly connected to the end-user device via a media streaming network link;

a control server hosting a list of the one or more multimedia receiver device(s) and associated controller(s); and a scheduling server arranged to provide meeting information to a controller of the one or more controllers;

wherein the system is arranged to use said meeting information for the selection of a multimedia receiver device from the list and the multimedia content to be streamed; and wherein the end-user device and the controller associated with the selected multimedia receiver device are arranged to initiate a media streaming session via the media streaming network link between the end-user device and the selected multimedia receiver device.

When viewed from a fourth aspect, the present invention provides a method of streaming data comprising multimedia content from an end-user device having a user interface to a multimedia receiver device comprising a multimedia interface suitable for connection to a video reception device, the method comprising:

using a scheduling server to provide meeting information to a controller, having a controller interface, that is associated with the multimedia receiver device;

connecting the controller to a control server to aggregate the meeting information with a list of one or more multimedia receiver device(s) and associated controller(s);

connecting the user interface of the end-user device to the control server to select the multimedia receiver device associated with the controller based on the meeting information;

selecting the multimedia content to be streamed via the user interface;

transmitting a stream request via a first control network link between the end-user device and the controller that is associated with the selected multimedia receiver device;

transmitting an initiation command from the controller to the selected multimedia receiver device(s) via a second control network link; and initiating a media streaming session via a media streaming network link between the end-user device and the selected multimedia receiver device(s).

In some embodiments of this third or fourth aspect of the invention, the end-user device and the controller associated with the selected multimedia receiver device are arranged to initiate a media streaming session upon receiving a user input via the controller interface or via the end-user device.

In some potentially overlapping embodiments of the third or fourth aspect of the invention, the end-user device comprises a user interface connected to the control server, said user interface being arranged for the selection of a multimedia receiver device from the list and the multimedia content to be streamed.

As is described above, selecting the multimedia receiver device associated with the controller based on the meeting information may be carried out in the background, e.g. because the meeting information includes the identity of one or more users expected to participate in a meeting and connecting the user interface of the end-user device to the control server includes providing a user identity. The user identity can be checked against the meeting information received from the controller and then a media streaming session automatically initiated between the end-user device and the selected multimedia receiver device associated with that controller.

As is described in more detail below, the control server may be arranged to aggregate the meeting information with user information received from an external user catalogue. The step of connecting the user interface of the end-user device to the control server, to select the multimedia receiver device associated with the controller based on the meeting information, may comprise verifying the identity of a user of the end-user device, e.g. using the user information received from an external user catalogue.

Preferably the scheduling server provides a secure source of meeting information. For example, the meeting information may include a verified list of one or more users who have security clearance for the meeting. This helps to ensure that the media streaming session only involves the correct participants at the location of the meeting. As the scheduling server may provide a trusted source of information as to the participants of a meeting, it may not be necessary in such arrangements to carry out any further confirmation steps (e.g. inputting access codes as described hereinabove), though these may of course still be carried out optionally, if desired, e.g. in order to provide an additional layer of security.

The scheduling server may be a completely separate server to the control server or these may share common hardware. Communication between the controller(s) and the scheduling server may take place via the control server, however in a preferred set of embodiments the one or more controllers are each connected to the scheduling server directly via a scheduling network link. This means that the control server does not have to be programmed or reprogrammed to communicate with the scheduling server.

In at least some embodiments, the meeting information comprises calendar data, wherein the calendar data comprises room location information regarding an intended location of a user e.g. for a meeting. For example, when a user adds a meeting to their calendar (e.g. via an exchange network link between the end-user device and the scheduling server) that includes the room location of the meeting (e.g. a specific conference room for a given meeting), this room location information can be used in order to determine which multimedia receiver the user should be streaming multimedia data to at a particular time. It will be appreciated that there are a number of calendar services known in the art per se, however in a set embodiments, the scheduling server comprises a Microsoft® Exchange Server.

Those skilled in the art will appreciate that the optional features described above with reference to the first and/or second aspects of the invention apply equally, where appropriate, to the third and/or fourth aspects of the invention.

The Applicant has recognised that initiating a media streaming session based on proximity detection provided by location information or meeting information inherently requires the users to be uniquely identified across all information sources. The system may therefore need a way of matching user information included in location information or meeting information with user information received by the end-user device and controller(s). This may be achieved using an external source of user information that may be independently accessed by the control server and by other components that provide location information or meeting information as described above. In some preferred embodiments, the control server is arranged to aggregate the location information and/or meeting information with user information received from an external user catalogue. For example, the external user catalogue may comprise a Microsoft® Active Directory.

Accordingly, in some embodiments the system further comprises an external user catalogue connected to the control server via a user verification network link. The control server may be arranged to verify the identity of a user of the end-user device, and/or a user of one of the controllers, based on user information received from the external user catalogue.

BRIEF DESCRIPTION OF THE DRAWINGS

Certain embodiments of the invention will now be described, by way of example only, with reference to the accompanying drawings in which.

DETAILED DESCRIPTION OF THE PREFERRED EMBODIMENTS

Figure 1:
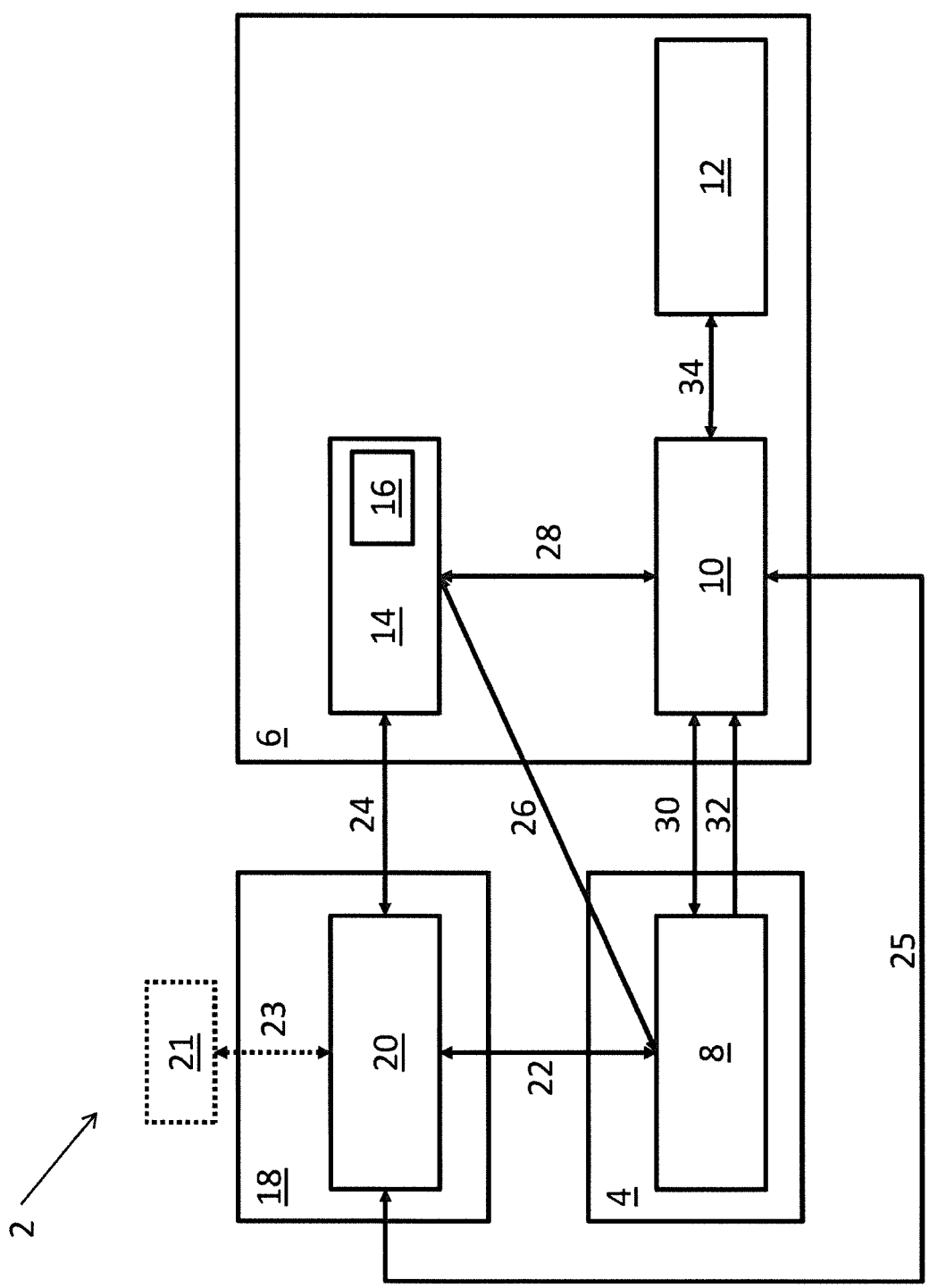
FIG. 1 shows a block diagram of a system in accordance with an embodiment of the present invention.

FIG. 1 shows a block diagram of a system 2 in accordance with an embodiment of the present invention. In this particular diagram, the system 2 is split across different rooms 4, 6—however it will be appreciated that the system 2 finds application in situations wherein a user wishes to share their screen onto an external display in the same room but does not wish to use a cable to do so, as will be described with reference to FIGS. 2 to 7.

The system 2 comprises an end-user device 8 located in a first room 4 (e.g. an office), and a controller 14 and multimedia receiver 10 located in a second room 6 (e.g. a conference room). The multimedia receiver 10 is, in this exemplary embodiment, connected to an external display 12 via a high-definition multimedia interface (HDMI®) cable 34.

The system 2 further comprises a control server 20 located in a remote location 18. The end-user device 8 is arranged to communicate with the controller 14 via a first control network link 26, and the controller 14 is then connected to the multimedia receiver 10 via a second control network link 28. As will be described in greater detail below with reference to FIGS. 2 to 7, these control network links 26, 28 are used to establish a multimedia streaming network link 32 (and optionally a third control network link 30) directly between the end-user device 8 and the multimedia receiver 10.

The multimedia streaming network link 32 is used to stream multimedia content directly from the end-user device 8 to the multimedia receiver 10, and in this particular embodiment is a one-way i.e. simplex communications link. The optional third control network link 30 allows for control signals to be sent directly between the end-user device 8 and the multimedia receiver 10 without needing to be relayed via the controller 14. Unlike the multimedia streaming network link 32, the third control network link 30 may be a two-way communications link. Of course, depending on the network infrastructure and its configuration (e.g. firewall settings), the stream may not be direct but instead carried out via a proxy connection.

The controller 14 has a touch panel 16 which can take user inputs such as accepting streaming sessions, terminating existing streaming sessions, pausing a stream, altering volume etc. The controller 14 may also take user inputs relating to the display of multimedia content on the display 12. For example, the controller 14 may be a Cyviz Controller designed to manage the display 12 in the form of a display wall.

The remote control server 20 is arranged to acquire data via a network link 24 from the controller 14 within the room 6 about its current status and to acquire data 25 from the receiver 10 about its status. The remote control server 20 can also provide data 22 to the end-user device 8 about the available controller(s) 14 and receiver(s) 10 as will be described in detail below with reference to FIG. 3.

In some optional examples, the control server 20 may also be arranged to acquire meeting information and/or location information regarding one or more users. In some examples, in order to access information about where a person is planned to be for a meeting, the control server 20 may be connected to a scheduling server 21 (e.g. Microsoft® Exchange Server) by an additional network link 23. Meeting information may be provided without necessarily having full access to a user's calendar. The control server 20 may be active in pulling meeting information from the scheduling server 21 to create an aggregated information set in the server 20, e.g. creating a database linking a stored list of the available controller(s) 14 and receiver(s) 10 with scheduled meetings in the room 6. The control server 20 may push data including meeting information via the network link 24 to the controller 14 within the room 6 or the controller 14 may pull data including meeting information via the network link 24 from the control server 20. In other embodiments, described below in relation to FIG. 16, the scheduling server 21 is instead connected directly to the room controller 14 and the controller 14 may instead be active in fetching meeting information from the scheduling server 21.

In some examples, in order to access information about the actual physical location of a user, the control server 20 may be connected to a location system 21 (e.g. geolocation system) by an additional network link 23. The control server 20 is arranged to acquire location information regarding the physical location of one or more users from the location system 21 and aggregate this location information with stored data relating to the location of the room 6'.

For example, when a user logs into the end-user device 8 the control server 20 knows the identity of the user and can send a user ID to the location system 21, asking for the known (i.e. detected) location of the user. Location information is returned from the location system 21 to the control server 20 and mapped against a stored list of the available controller(s) 14 and receiver(s) 10 in the room 6 having the same location as the user. Of course this mapping has to take into account the precision level of the location information received from the location system 21. The user may need to be presented with a list of likely rooms, based on the location information, with user input required to verify the correct room.

The location information may comprise real-time information regarding the user's actual (confirmed) location, e.g. using an indoor positioning system 21 where one or more beacon(s) are located throughout the workplace (e.g. throughout an office building or campus) and users carry an ID tag that can be read by the beacon(s) in order to determine where these users are physically located at a point in time. This location information can then be used by the control server 20 to determine whether a user of the end-user device 8 should be allowed to stream data to the display 12 based on their location and/or used to determine which room 6 the user should be streaming multimedia data to such that the selection of the appropriate multimedia receiver 10 may be made automatically without requiring user intervention beyond an initial user input via the controller interface 16 or the end-user device 8.

The location system 21 may provide sufficiently trustworthy location information that it may not be necessary in such arrangements to carry out any further confirmation steps (e.g. inputting access codes including OTA codes as described below). However, using such access codes in combination with the location system 21 may be advantageous if the location system 21 provides location information indicating a rough area in which the user is located, thus narrowing down the number of viable rooms, but that is not necessarily sufficient to specify exactly or definitively which room a given user should be streaming multimedia data to.

Figure 2:
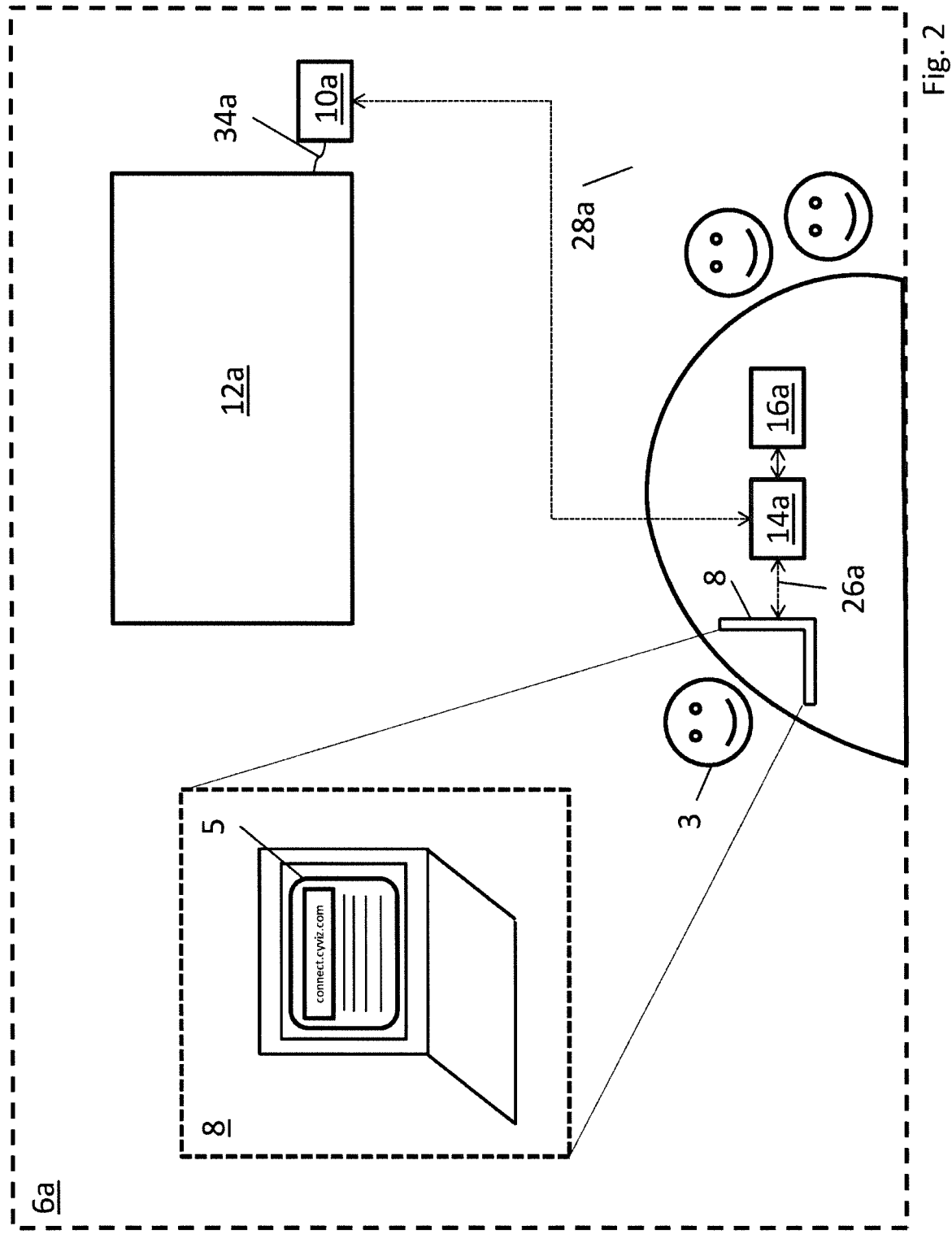
FIG. 2 illustrates the system of FIG. 1 wherein a presenter wishes to share their screen in a meeting in a conference room.

FIG. 2 illustrates the system 2 of FIG. 1 wherein a user 3 wishes to their screen in a meeting in a conference room. Here the user 3 wishes to share his screen to provide a presentation to a group of colleagues situated in a conference room 6a, wherein the presentation should be displayed on a large external monitor 12a. The user 3 opens up his web browser 5 on his laptop 8 and navigates to a particular web address which provides a web based user interface for establishing a streaming session. The user 3 uses this interface to indicate that he would like to set up a streaming session with the participants in the conference room 6a. The user interface provides the user 3 with data 22 comprising a list of the available controller(s) 14 and receiver(s) 10 as will be described with reference to FIG. 3.

It can be seen that there is a first control network link 26a between the user's laptop 8 and the controller 14a in the room 6a, and a second control network link 28a between the controller 14a and the receiver 10a. The receiver 10a is physically connected to the monitor 12a by a HDMI® cable 34a.

Figure 3:
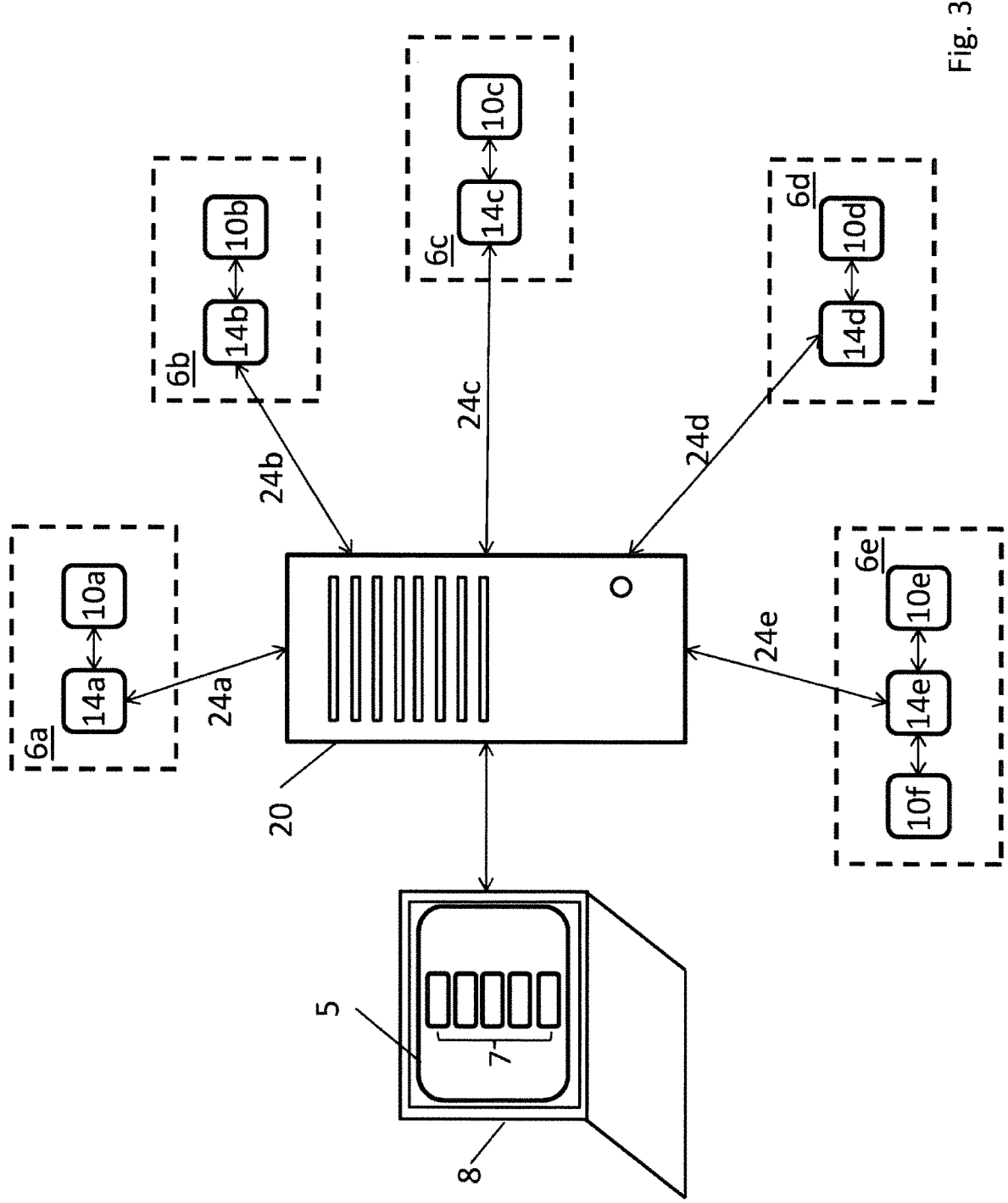
FIG. 3 shows a typical network topography of the system of FIG. 1 including a remote server.

FIG. 3 shows a typical network topography of the system 2 of FIG. 1 including the remote control server 20. The control server 20 has stored within it a list of all of the conference rooms 6a-e with which media streaming sessions can be established. Each conference room 6a-e has its own dedicated controller 14a-e and multimedia receiving device 10a-e, data relating to the availability of each is transmitted by network links 24a-e to the control server 20. Typically the conference rooms 6a-e are all connected to the same company network.

The user 3 is then presented with a list 7 of available conference rooms 6a-e to which he can begin streaming media data. The list 7 is displayed within the web based user interface via the web browser 5.

Figure 4:
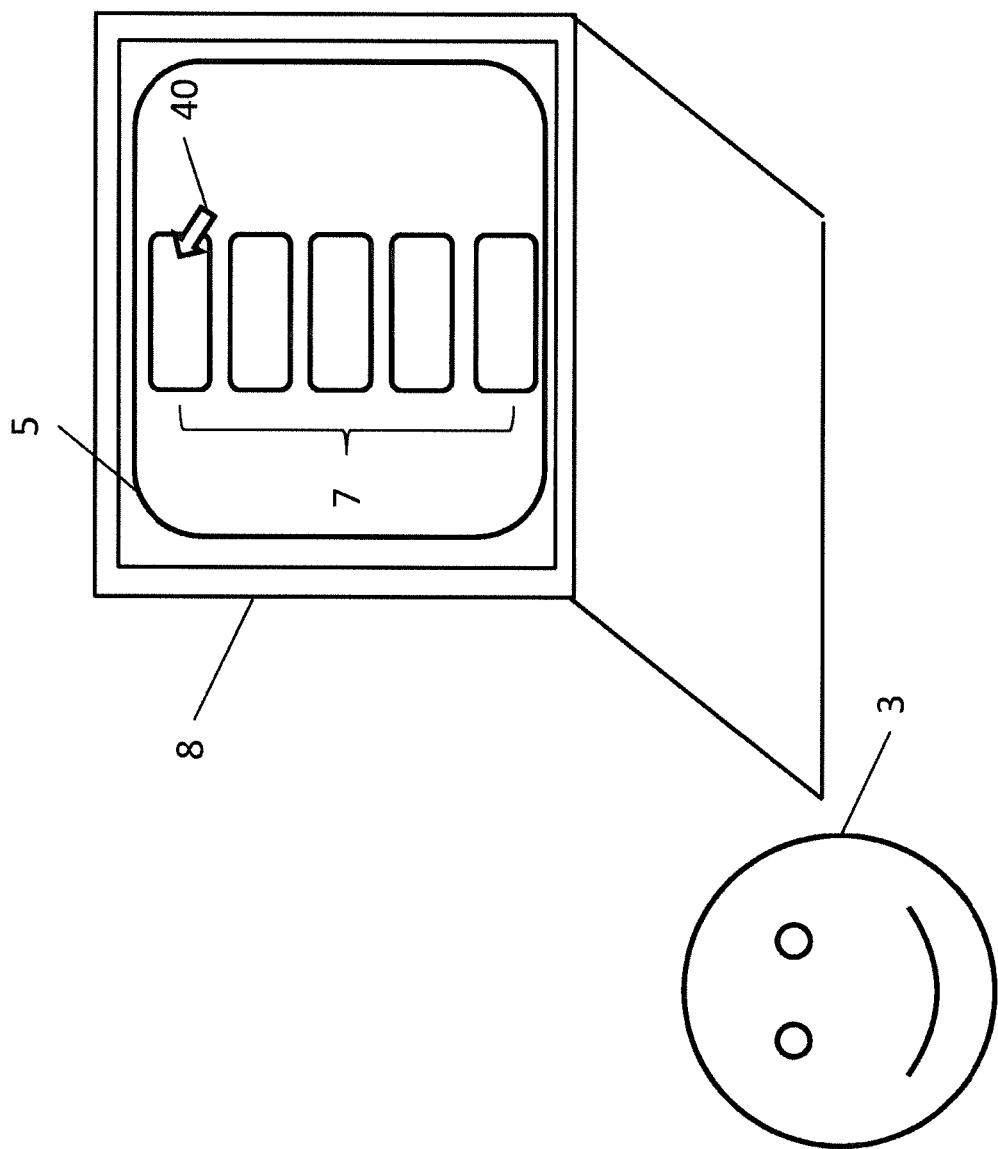
FIG. 4 shows the presenter selecting the conference room.

FIG. 4 shows the presenter selecting the conference room 6a in which the meeting is taking place. In this particular embodiment, the user 3 selects conference room 6a from the list 7 by moving a mouse cursor 40 over a button within the web based user interface and performing a mouse click.

Figure 5:
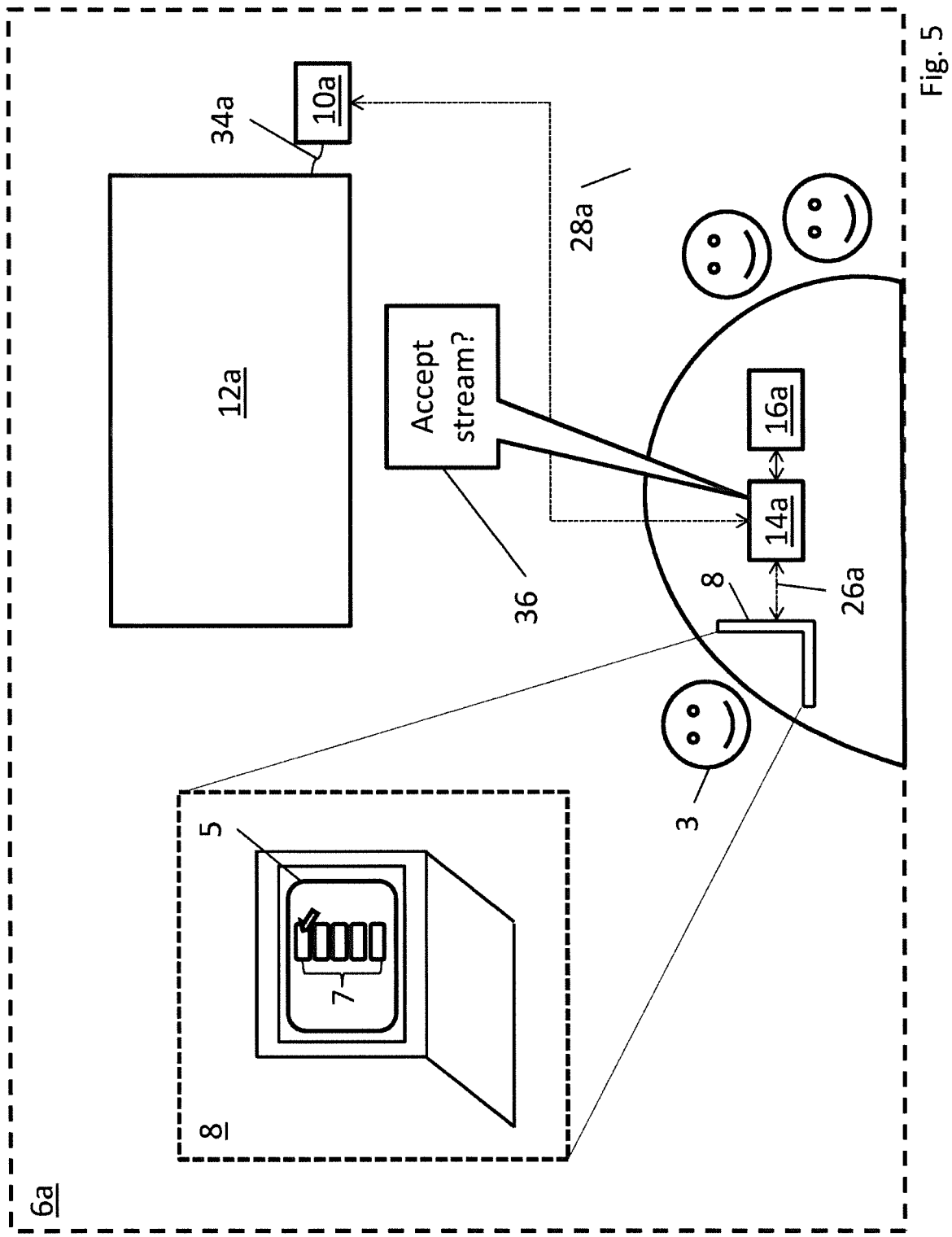
FIG. 5 shows the controller requiring confirmation in order to continue.

FIG. 5 shows the controller 14a requiring confirmation from somebody within the conference room 6a which may be a colleague or the user 3. After the user 3 has selected the conference room 6a, a request signal is transmitted to the controller 14a via the first control network link 26a, indicating to said controller 14a that the user 3 wishes to stream media data to the corresponding multimedia receiver 10a.

Upon receiving the request signal via the first control network link 26a, the controller 14a displays on the touch panel 16a a confirmation message 36. This confirmation message 36 conveys to the participants in the room that the user 3 wants to stream media content to the display 12a in their current location, conference room 6a to ensure that the user 3 has selected the correct room. One of the participants or the user 3) must accept the request by e.g. pressing a button on the touch panel 16*a*. This ensures that the correct recipient is in close proximity to the receiver 10*a* and its associated controller 14*a* in the correct meeting room 6*a*. Once accepted, the controller 14*a* sends an acceptance signal back to the laptop 8 via the first control network link 26*a* to state that the streaming request has been accepted. The controller 14*a* also sends an initiation signal to the multimedia receiver 10*a* via the second control network link 28*a* to indicate that it should expect a new WebRTC stream directly from the laptop 8.

Figure 6:
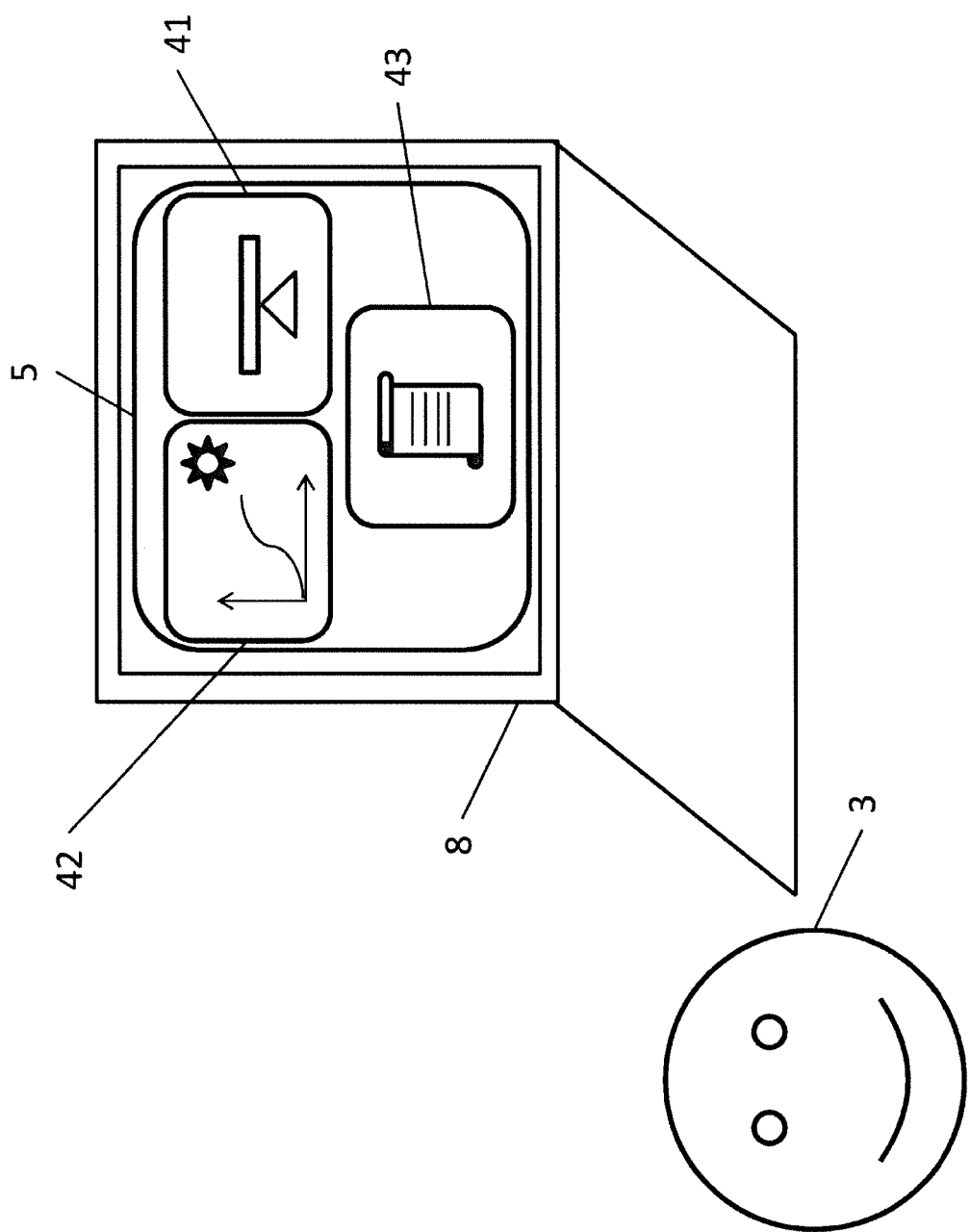
FIG. 6 shows the presenter selecting the media content he or she wishes to show on the external display.

FIG. 6 shows the user 3 selecting the media content he or she wishes to show on the external display 12*a* within the conference room 6*a*. In this particular example, the user 3 is presented with a choice between sharing the content of his or her screen 42, a specific application 43, or a webcam feed 41. As will be discussed below with reference to FIG. 13, in some examples the user might choose to stream different types of media content to different external displays. Once the user selects the type of media content to be streamed from the laptop 8 to the multimedia receiver 10*a*, the media streaming can begin.

Figure 7:
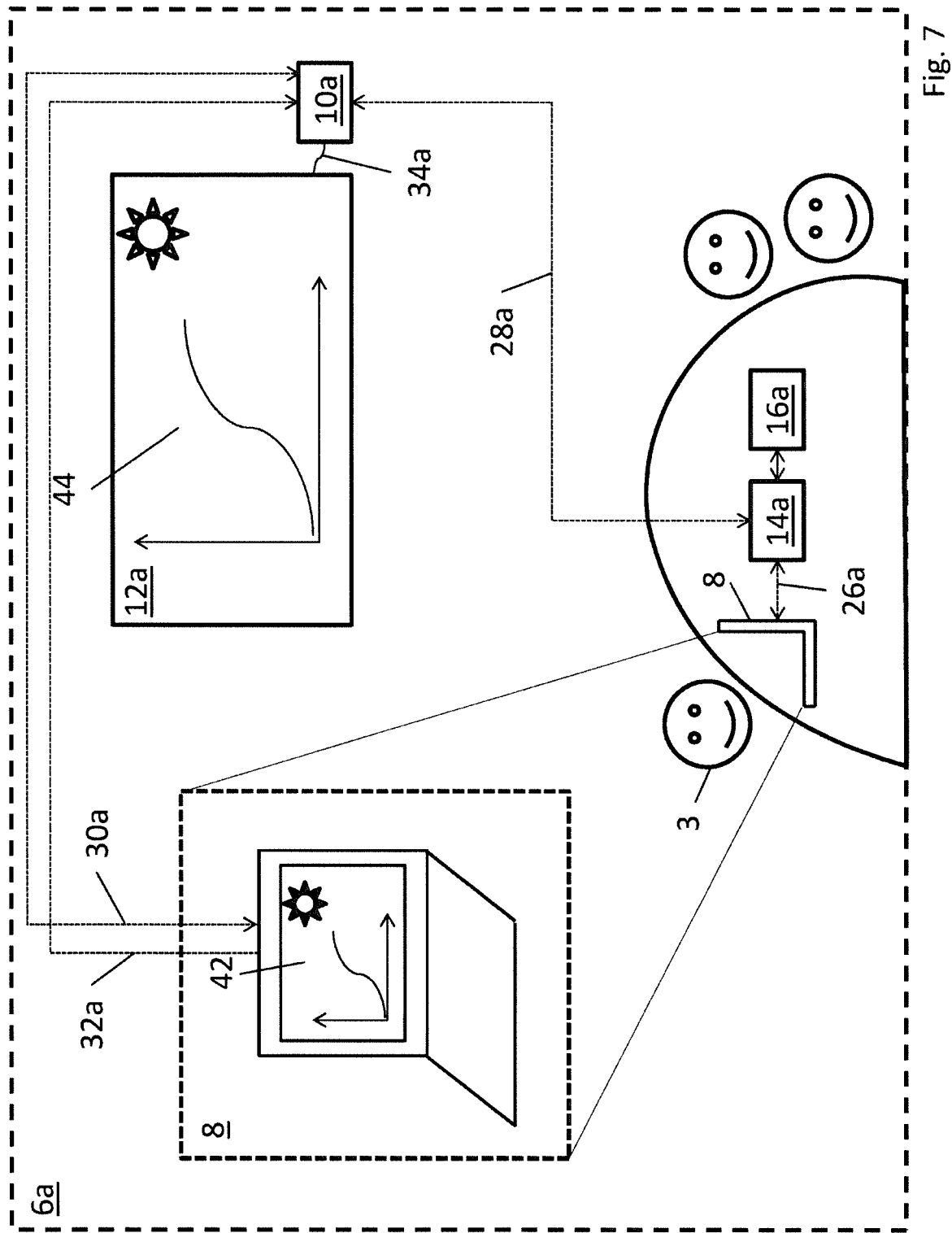
FIG. 7 shows the system once a media streaming network link has been established.

FIG. 7 shows the system 2 once a media streaming network link 32*a* has been established. After the system 2 has performed any confirmation steps that it requires (either one-way or two-way as per FIGS. 5 and 6), a media streaming network link 32*a* between the end-user device i.e. the laptop 8 and the multimedia receiver 10*a* is established. The media streaming network link 32*a* is a WebRTC session, wherein data is sent browser-to-browser from the web browser 5 running on the laptop 8 to the multimedia receiver 10*a*.

As can be seen from FIG. 7, once the WebRTC session is established, the image 42 appearing on the monitor connected to the laptop 8 is then mirrored to the external display 12 as the image 44.

Also shown within FIG. 7 is a third control network link 30*a* which is established directly between the laptop 8 and the multimedia receiver 10*a*. This third control network link 30*a* allows for control signals used for e.g. disconnecting from the stream or pausing the stream to be sent directly between the multimedia receiver 10*a* and the laptop 8 without necessarily needing to be sent via the controller 14*a*.

Figure 8:
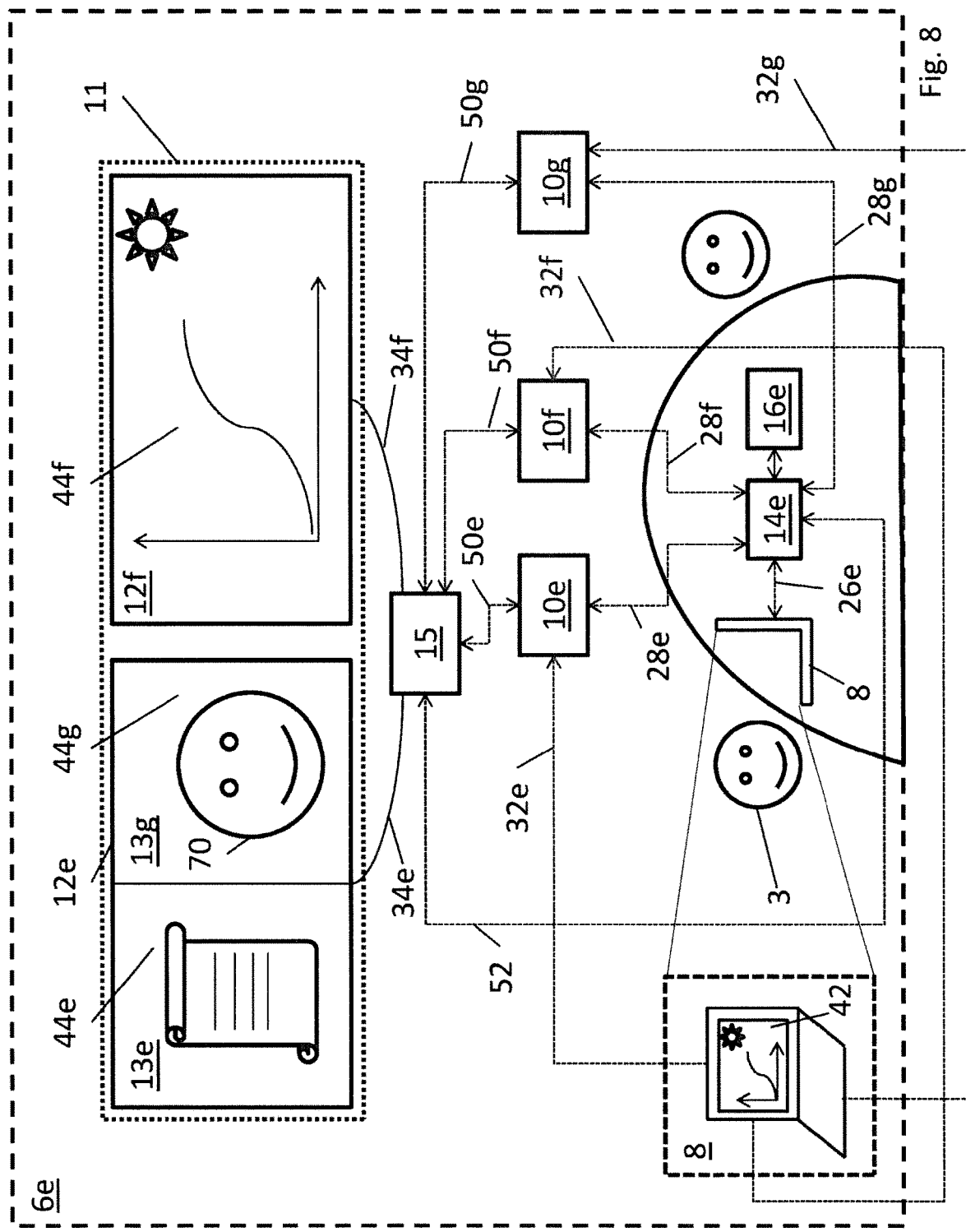
FIG. 8 shows the system of FIG. 1 wherein multiple receivers are connected to a matrix device.

FIG. 8 shows the system of FIG. 1 wherein multiple receivers 10*e*, 10*f*, 10*g* are connected to a matrix device 15. In this embodiment, the system 2 being used to share different media streams to multiple displays 12*e*, 12*f* in the same room. In this embodiment, the user 3 has selected from the list 7 the conference room 6*e* in which a meeting is taking place. Conference room 6*e* has two external displays 12*e*, 12*f* connected to the matrix device 15, which is in turn connected to the three multimedia receivers 10*e*, 10*f*, 10*g*. Each of the multimedia receivers 10*e*, 10*f*, 10*g* is connected to the same controller 14*e* which in turn has a touch panel 16*e*.

In this particular embodiment, the first and second displays 12*e*, 12*f* are in fact not physically distinct monitors but instead form separate panels making up (at least part of) an array such as a Cyviz display wall 11.

In this embodiment, the user 3 wishes to share his screen on one display 12*f*, and a webcam feed of a remote user 70 to be shown alongside a further specific application (in this case an application running on the laptop 8) on the other display 12*e* in virtual windows 13*e*, 13*g* respectively. The participants within the conference room 6*e* can select the placement of each media stream (i.e. the shared screen, the application and the webcam video feed) using options presented to them via the controller touch panel 16*e*.

As before, the end-user device 8 also transmits a request signal to the controller 14*e* in the conference room 6*e* via a first control network link 26*e*, which in turn notifies the respective multimedia receivers 10*e*, 10*f*, 10*g* via their respective second control network links 28*e*, 28*f*, 28*g*. Separate media streaming network links 32*e*, 32*f*, 32*g* are then established between the laptop 8 and the multimedia receivers 10*e*, 10*f*, 10*g* respectively in the same manner as already described hereinabove. Each of these media streaming network links 32*e*, 32*f*, 32*g* are separate, dedicated WebRTC sessions, wherein data is sent browser-to-browser from the web browser 5 running on the computer 8 to the respective multimedia receivers 10*e*, 10*f*, 10*g* in parallel. There may also be separate dedicated third control network links between the computer 8 and each of the multimedia receivers 10*e*, 10*f*, 10*g*, but these control network links are not shown in the Figure for the sake of clarity.

As can be seen from FIG. 8, the first multimedia receiver 10*e* obtains data from the first media streaming network link 32*e*, converts it to a video signal and transmits it to the matrix device 15 via a first matrix link 50*e*. Similarly, the second and third multimedia receivers 10*f*, 10*g* obtain data from the second and third media streaming network links 32*f*, 32*g*, convert the respective data to video signals and transmit said video signals to the matrix device 15 via second and third matrix links 50*f*, 50*g* respectively.

The matrix device 15 detects the video signals and uses an Automatic Video Routing Algorithm (known in the art per se and documented with reference to the Cyviz Display Controller) in order to route the video signals to the chosen displays 12*e*, 12*f*. The video signals from the first and third multimedia receivers 10*e*, 10*g* are routed to the first display 12*e* within virtual windows 13*e*, 13*g* via a first HDMI® cable 34*e*. After establishment of the first and third WebRTC sessions, the application 44*e* is displayed on the first external display 12*e* in the first virtual window 13*e* while the video 44*g* from the webcam is in the second virtual window 44*g*.

In parallel, the matrix device 15 routes the video data from the second multimedia receiver 10*f* to the second display 12*f* via a second HDMI® cable 34*f*. Once the second WebRTC session is established, the image 42 appearing on the monitor connected to the laptop 8 is then mirrored to the second external display 12*f* as the image 44*f*.

Figure 9:
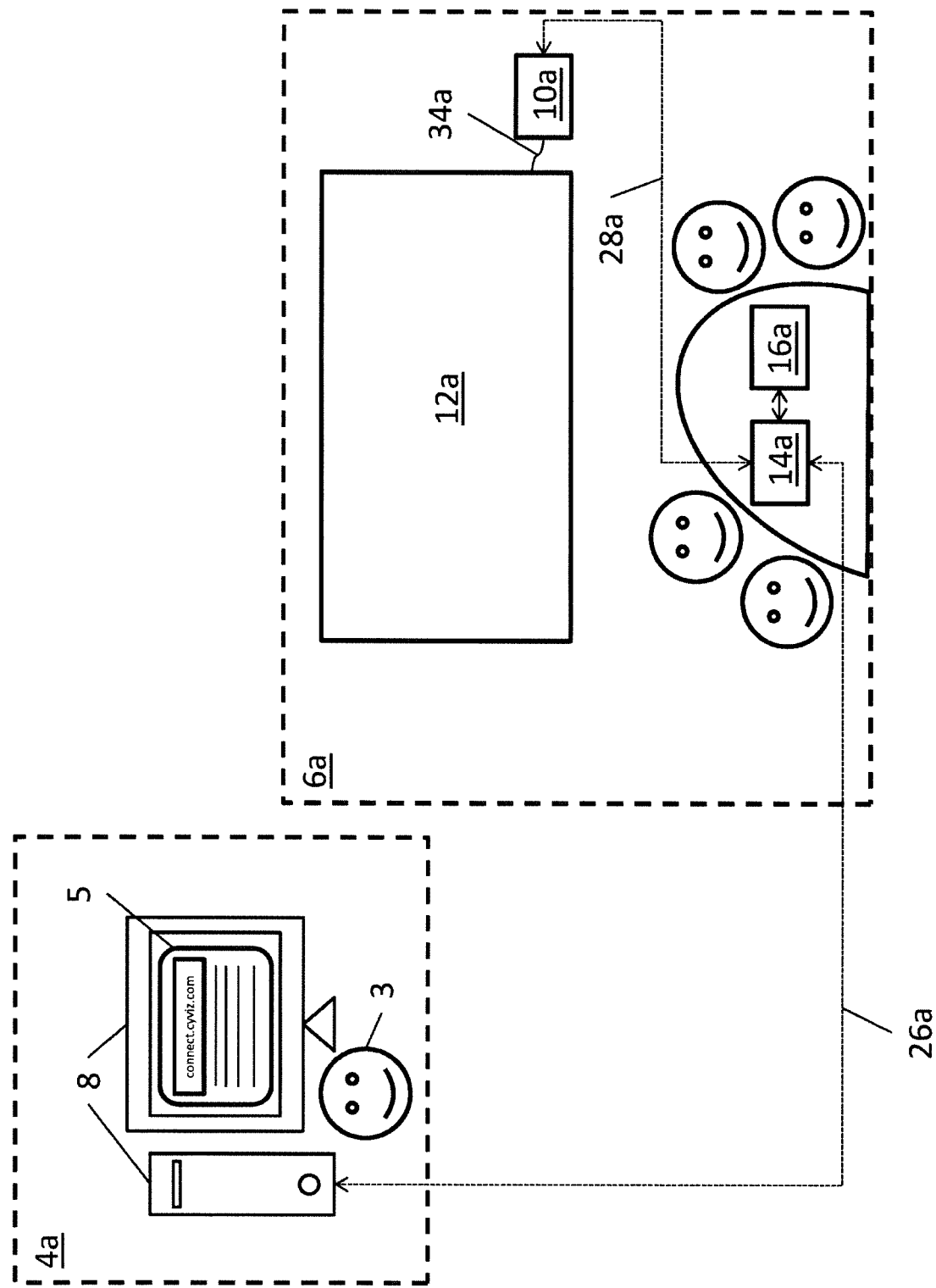
FIG. 9 illustrates the system of FIG. 1 wherein a presenter wishes to set up a webconferencing session from a remote location to a conference room.

FIG. 9 illustrates the system 2 of FIG. 1 wherein a user 3 wishes to set up a media streaming session from a remote location such as an office 4*a* to the conference room 6*a*. Here the user 3, located in his office 4*a* wishes to share his screen to provide a presentation to a group of colleagues situated in a conference room 6*a*, wherein the presentation should be displayed on a large external monitor 12*a*. It can be seen that there is a first control network link 26*a* between the user's computer 8 and the controller 14*a* in the room 6*a*, and a second control network link 28*a* between the controller 14*a* and the receiver 10*a*. The receiver 10*a* is physically connected to the monitor 12*a* by a HDMI® cable 34*a*.

The user 3 opens up his web browser 5 on his computer 8 and navigates to a particular web address which provides a web based user interface for establishing a streaming session. The user 3 uses this interface to indicate that he would like to set up a streaming session with the participants in the conference room 6*a*.

Figure 10:
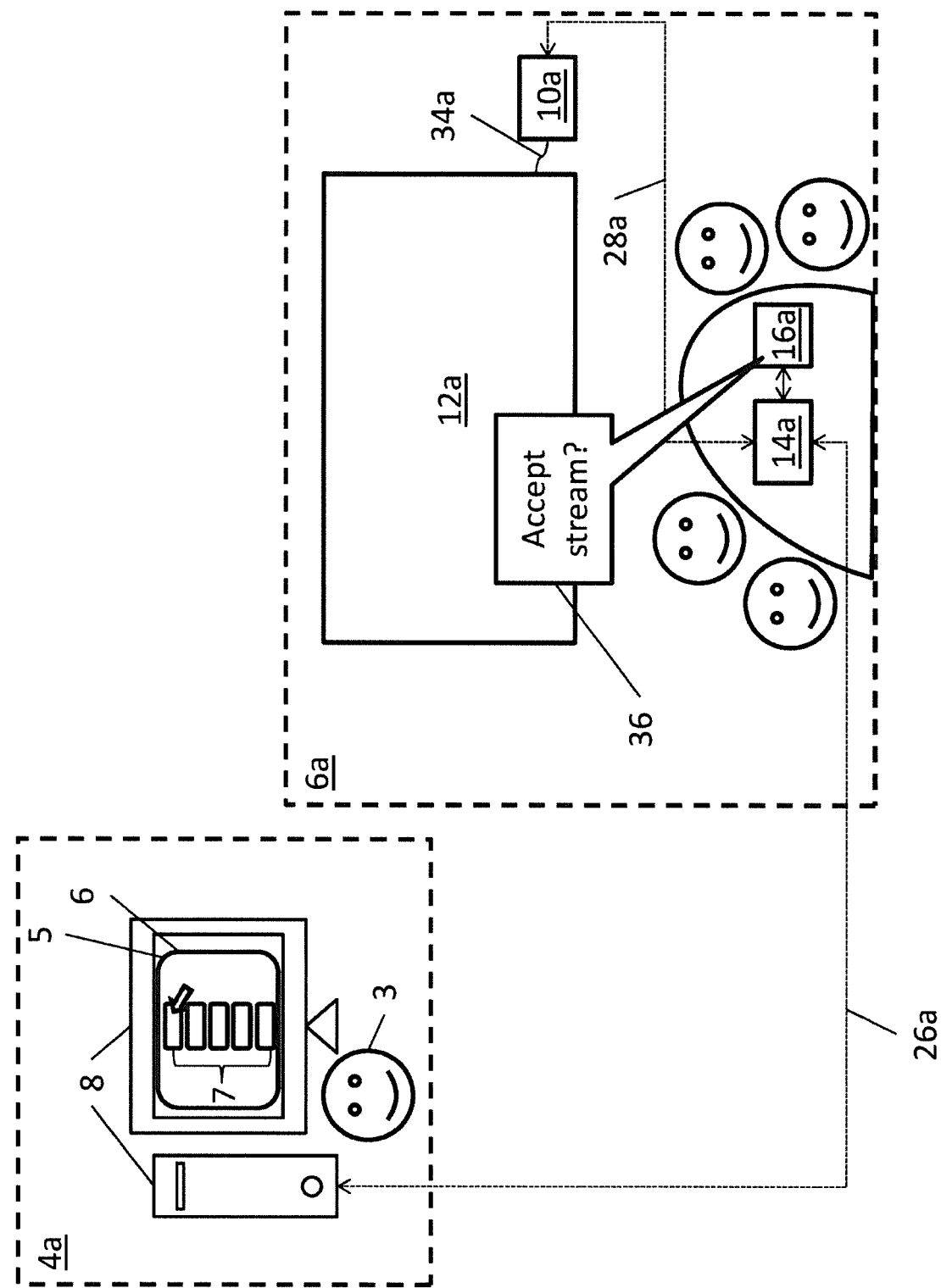
FIG. 10 shows the controller requiring confirmation from participants within the conference room in order to continue.

FIG. 10 shows the controller 14*a* requiring confirmation from participants within the conference room 6*a*. After the user 3 has selected the conference room 6*a*, a request signal is transmitted to the controller 14*a* via the first control network link 26a, indicating to said controller 14a that the user 3 wishes to stream media data to the corresponding multimedia receiver 10a.

Upon receiving the request signal via the first control network link 26a, the controller 14a displays on the touch panel 16a a confirmation message 36. This confirmation message 36 conveys to the participants in the room that the user 3 wants to stream media content to the display 12a in their current location, conference room 6a. One of the participants must accept the request by e.g. pressing a button on the touch panel 16a. This ensures that the correct recipient is in close proximity to the receiver 10a and its associated controller 14a in the correct meeting room 6a. Once accepted, the controller 14a sends an acceptance signal back to the computer 8 via the first control network link 26a to state that the streaming request has been accepted. The controller 14a also sends an initiation signal to the multimedia receiver 10a via the second control network link 28a to indicate that it should expect a new WebRTC stream directly from the computer 8.

Figure 11:
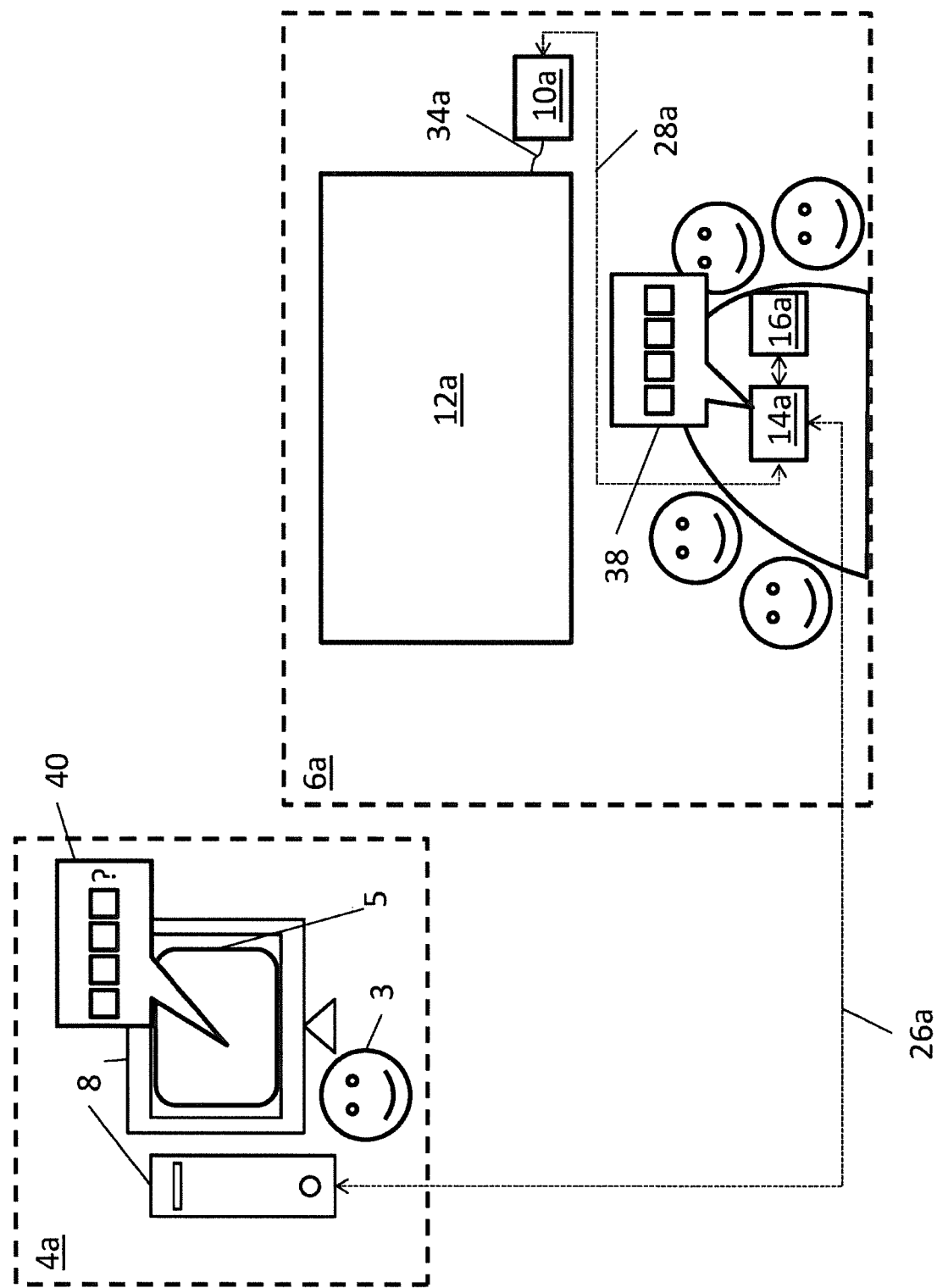
FIG. 11 shows the end-user device requiring a PIN code for mutual authentication.

FIG. 11 shows the end-user device 8 requiring a PIN code for mutual authentication. While the stream could be established immediately following the confirmation within the conference room 6a as described above with reference to FIG. 10, in this particular embodiment the system 2 requires mutual authentication.

Following the acceptance step described previously, the controller 14a displays a four digit PIN code 38 on the touch panel 16a. This same PIN code 38 must then be entered into the browser 5 via a PIN confirmation screen 40 within the web-based user interface. Since the PIN code 38 must be relayed to the user 3, he can be confident that he has indeed selected the correct room and that any data he chooses to stream will not be made available to unintended participants.

Figure 12:
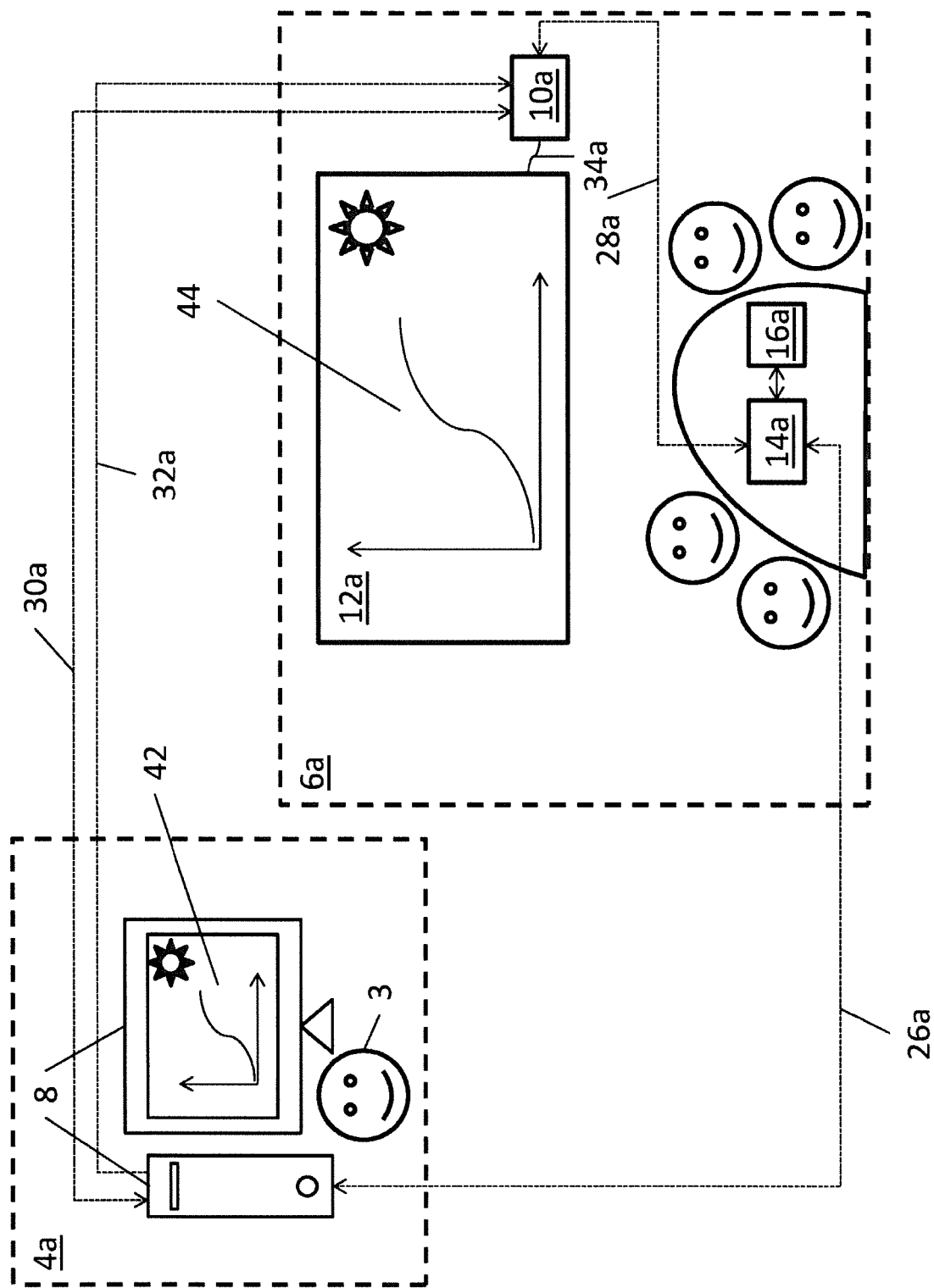
FIG. 12 shows the system once a media streaming network link has been established between the remote location and the conference room.

FIG. 12 shows the system 2 once a media streaming network link 32a has been established. After the system 2 has performed all of the required confirmation steps, a media streaming network link 32a between the end-user device i.e. the computer 8 and the multimedia receiver 10a is established. The media streaming network link 32a is a WebRTC session, wherein data is sent browser-to-browser from the web browser 5 running on the computer 8 to the multimedia receiver 10a.

As can be seen from FIG. 12, once the WebRTC session is established, the image 42 appearing on the monitor connected to the laptop 8 is then mirrored to the external display 12 as the image 44.

Also shown within FIG. 12 is a third control network link 30a which is established directly between the computer 8 and the multimedia receiver 10a. This third control network link 30a allows for control signals used for e.g. disconnecting from the stream or pausing the stream to be sent directly between the multimedia receiver 10a and the computer 8 without necessarily needing to be sent via the controller 14a.

Figure 13:
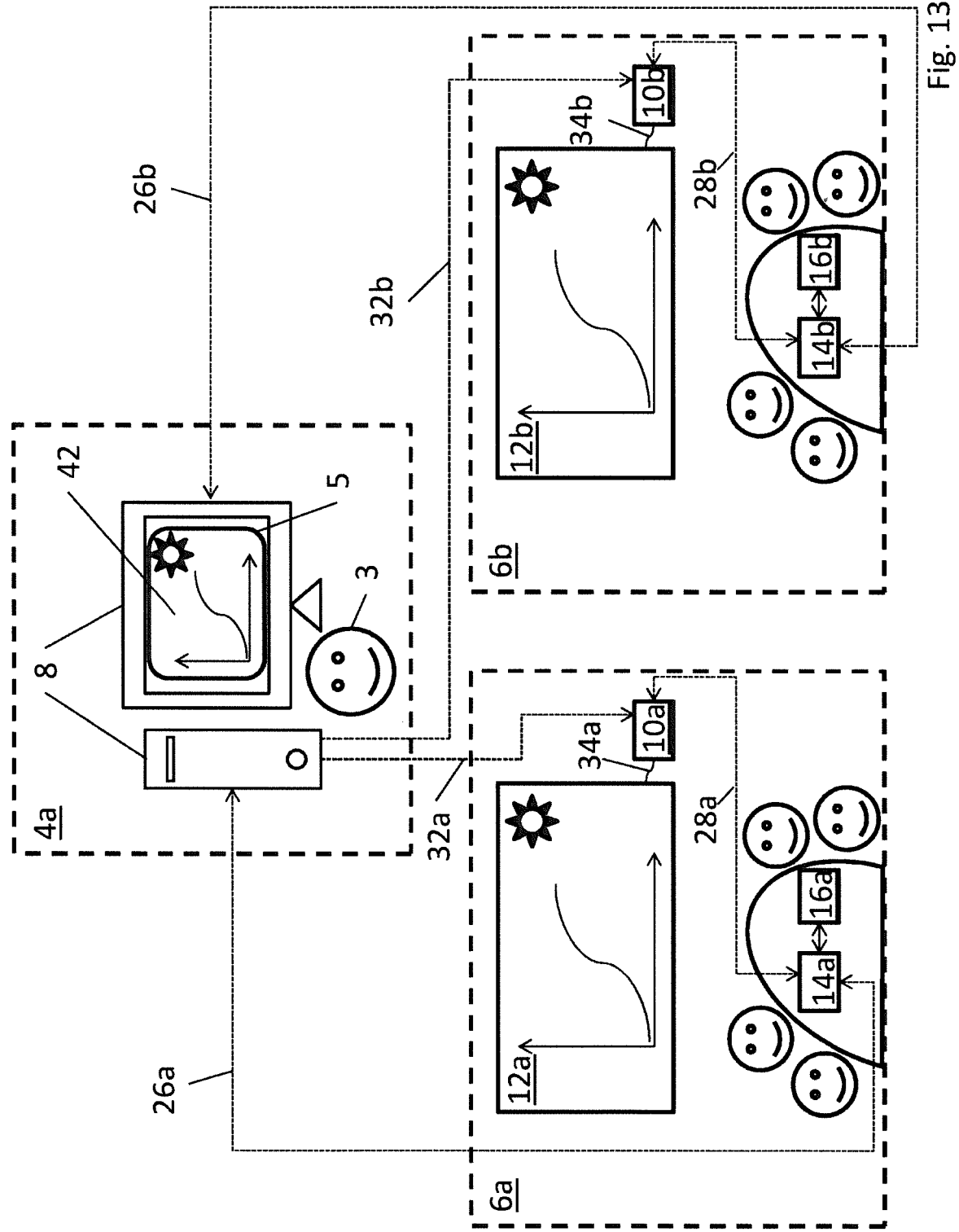
FIG. 13 shows the system being used to share the user's screen to multiple locations.

FIG. 13 shows the system 2 being used to share the user's screen 42 to multiple locations 6a, 6b. In this embodiment, the user 3 has selected two conference rooms 6a, 6b available for selection from the list 7. The connections between the computer 8 and the devices within the first conference room 6a are the same as described hereinbefore with reference to FIGS. 2 to 12.

In this embodiment, the end-user device 8 also transmits a request signal to the controller 14b in the second conference room 6b via a further control network link 26b. Once either one- or two-way authentication has been achieved as required, a second media streaming network link 32b between the end-user device (i.e. the computer 8) and the multimedia receiver 10b is established. The second media streaming network link 32b is a separate, dedicated WebRTC session, wherein data is sent browser-to-browser from the web browser 5 running on the computer 8 to the multimedia receiver 10b in parallel to the data being sent via the first media streaming network link 32a. There are also separate dedicated control network links between the computer 8 and each of the multimedia receivers 10a, 10b, but these control network links are not shown in the Figure for the sake of clarity.

Figure 14:
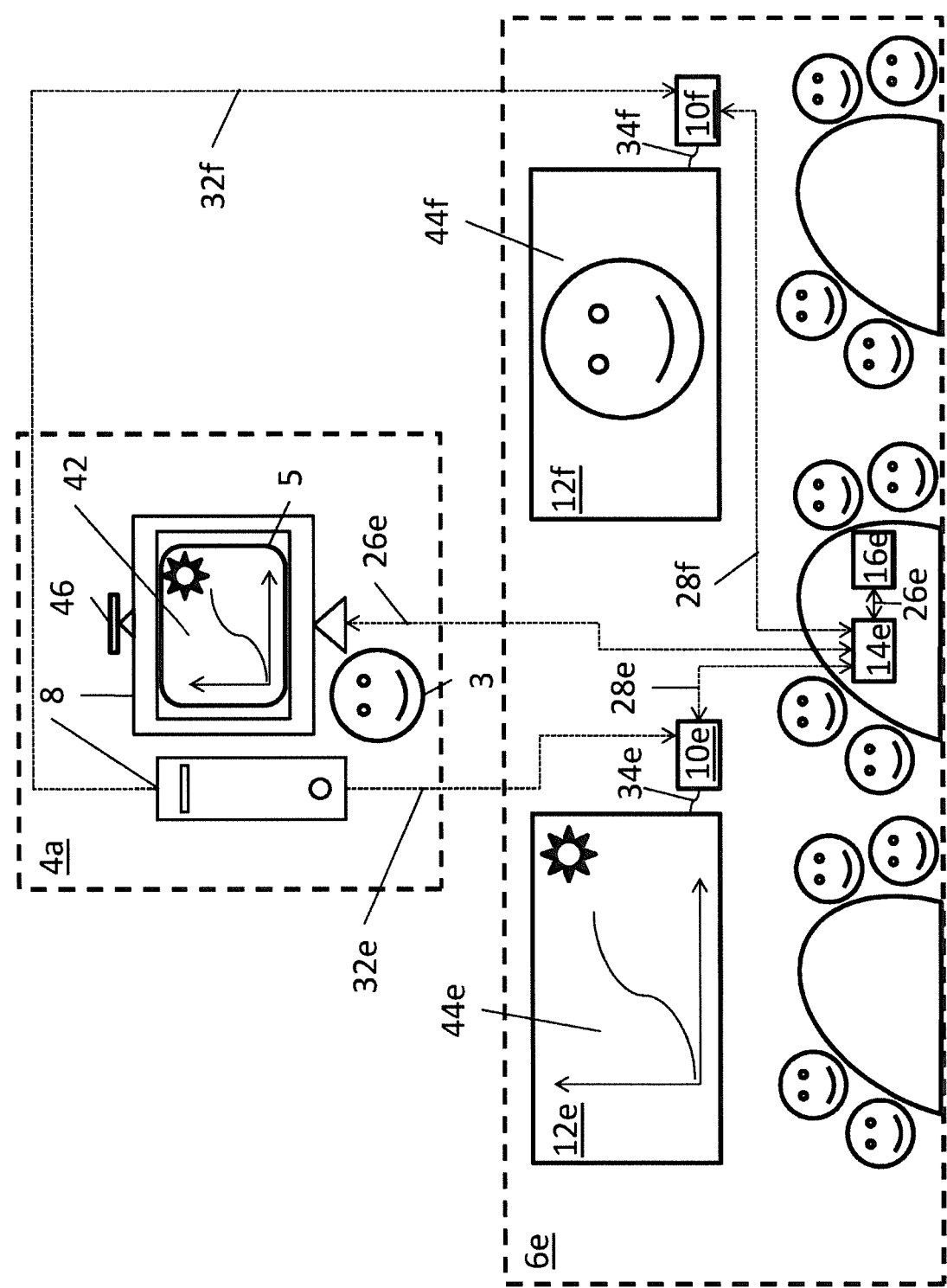
FIG. 14 shows the system being used to share different media streams to multiple displays in the same room.

FIG. 14 shows the system 2 being used to share different media streams to multiple displays in the same room. In this embodiment, the user 3 has selected from the list 7 a conference room 6e that has two external displays 12e, 12f each being connected to a separate multimedia receiver 10e, 10f respectively. Each of the multimedia receivers 10e, 10f is connected to one central controller 14e which in turn has a touch panel 16e.

In this embodiment, the user 3 wishes to share his screen on one display 12e and have a video feed from his webcam 46 be shown on the other display 12f. It is however envisioned that the participants within the conference room 6e could select the placement of each media stream (i.e. the shared screen and the webcam video feed) using options presented to them via the controller touch panel 16e.

As before, the end-user device 8 also transmits a request signal to the controller 14e in the conference room 6e via a first control network link 26e, which in turn notifies the respective multimedia receivers 10e, 10f via their respective second control network links 28e, 28f. Separate media streaming network links 32e, 32f are then established between the end-user device (i.e. the computer 8) and the multimedia receivers 10e, 10f respectively in the same manner as already described hereinabove. Each of these media streaming network links 32e, 32f are separate, dedicated WebRTC sessions, wherein data is sent browser-to-browser from the web browser 5 running on the computer 8 to the respective multimedia receivers 10e, 10f in parallel. There may also be separate dedicated third control network links between the computer 8 and each of the multimedia receivers 10e, 10f, but these control network links are not shown in the Figure for the sake of clarity.

As can be seen from FIG. 14, the first multimedia receiver 10e obtains data from the first media streaming network link 32e, converts it to a video signal and transmits it to the first display 12e via a first HDMI® cable 34e. Once the first WebRTC session is established, the image 42 appearing on the monitor connected to the computer 8 is then mirrored to the first external display 12e as the image 44e. In parallel, the second multimedia receiver 10f obtains data from the second media streaming network link 32f, converts it to a video signal and transmits it to the second display 12f via a second HDMI® cable 34f. Similarly, after establishment of the second WebRTC session, the video 44f from the webcam 46 is then displayed on the second external display 12f.

Of course the first and second displays 12e, 12f may not be physically distinct monitors but could be separate panels making up (at least part of) an array such as a Cyviz display wall.

Figure 15:
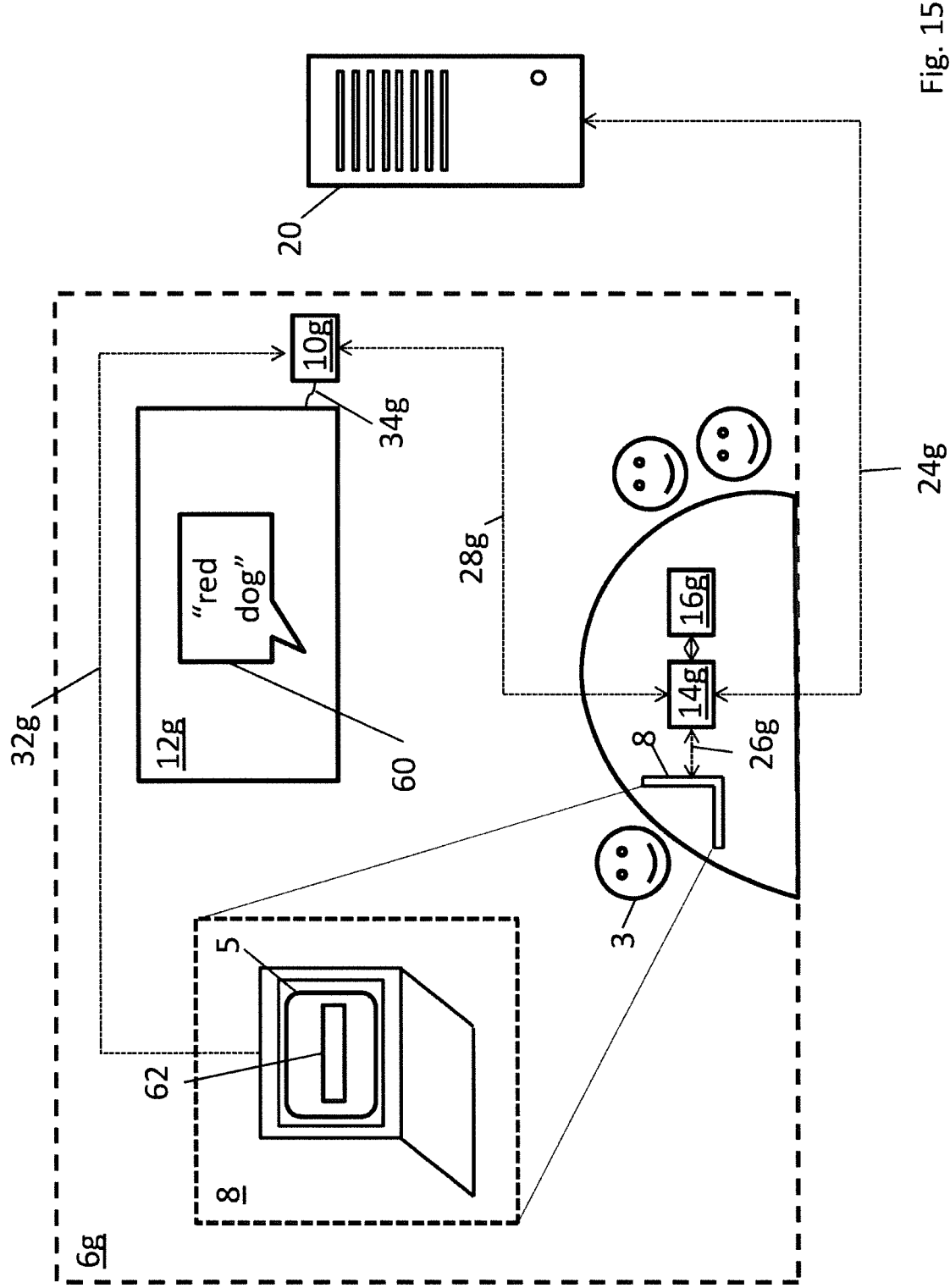
FIG. 15 shows the controller providing a one-time authorisation (OTA) code in order to establish a media streaming network link.

FIG. 15 shows the system 2 in an alternative configuration wherein the controller 14g provides a one-time authorisation (OTA) code 60 in order to establish a media streaming network link. Here the user 3 in conference room 6g wishes to share his screen on the display 12g. However, instead of requiring a manual selection of the receiver 10g in the conference room 6g from a list as described previously, an OTA code option is provided by the system 2. An OTA code

60 is generated by the control server 20 and provided to the controller 14*g* via a network link 24*g*. The multimedia receiver 10*g* then displays the OTA code 60 on the display 12*g* and in this case the OTA code 60 reads "red dog". It will of course be appreciated that the OTA code 60 could instead be displayed on the touch panel 16*g*.

The user 3 enters "red dog" into a dialogue box 62 within the web browser 5 on his laptop 8, which is then relayed to the control server 20. The control server 20 has a list of current OTA codes and matches the entry "red dog" to the receiver 10*g* and associated controller 14*g* (there is a one-to-one relationship between the OTA codes and the receivers in the list stored on the server 20). A WebRTC media streaming network link 32*g* between the end-user device i.e. the laptop 8 and the multimedia receiver 10*g* is then "seamlessly" established without any further intervention by the user 3. Of course, this approach requires the user 3 to be present in the same room 6*g* as the intended receiver 10*g*, or in communication with someone in the room, thereby achieving proximity detection.

Figure 16:
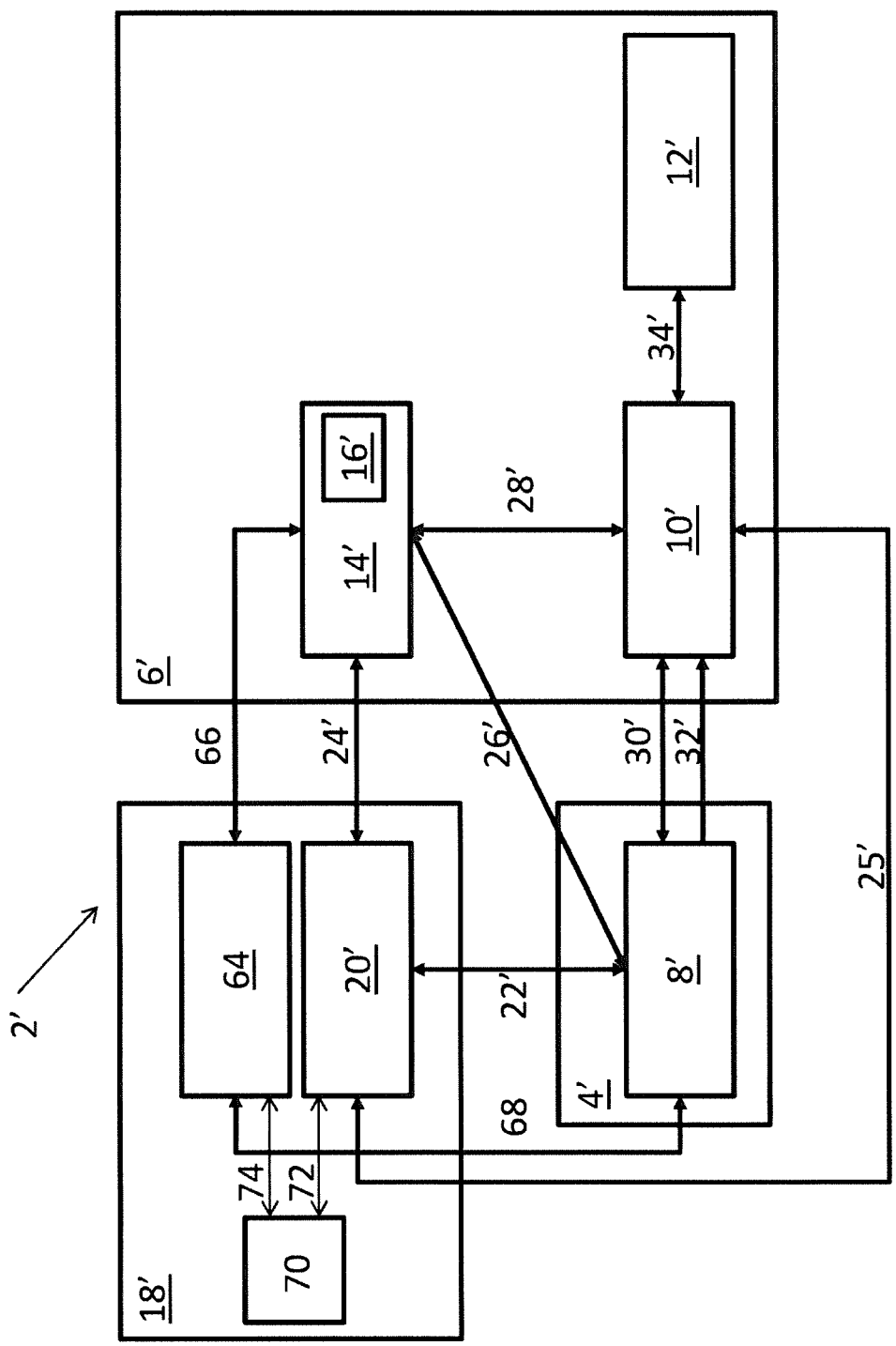
FIG. 16 shows a block diagram of a system in accordance with a further embodiment of the present invention.

FIG. 16 shows a block diagram of a system 2' in accordance with a further embodiment of the present invention, wherein like reference numerals denote like elements. As before, the system 2' is split across different rooms 4', 6' but also supports users wishing to share their screen onto an external display in the same room but without using a cable to do so, as described previously with reference to FIGS. 2 to 7.

In addition to the components described previously with reference to FIG. 1, the system 2' of FIG. 16 further comprises a scheduling server 64 and an external user catalogue 70 in a remote location 18'. For ease of illustration, the scheduling server 64 and external user catalogue 70 are shown as being in the same remote location 18' as the control server 20', however it will be appreciated that this does not necessarily need to be the case and these servers 20', 64, 70 could be in different physical locations to one another. The servers 20', 64, 70 may not be physically distinct but may be different server applications running in parallel on common server hardware.

The scheduling server 64 is arranged to store meeting information regarding one or more users and/or one more room bookings. This meeting information may be used by the system 2' when determining whether or not a user is proximate to the room 6' (or at least is supposed to be) e.g. to present on the display 12' within the room 6'. The scheduling server 64 may provide this meeting information to the controller 14' via a scheduling network link 66, such that the controller 14' is aware of the expected participation of the user(s) in a scheduled meeting and/or is aware of which user(s) are scheduled to be in the room 6' according to room booking information stored by the scheduling server 64. The controller 14' is active in pulling meeting information from the scheduling server 64, for example intermittently, regularly or continuously fetching room booking information for the room 6' via the scheduling network link 66. Advantageously, the controller 14' does not need to access individual users' calendars as the meeting information provided via the scheduling network link 66 may be limited to a list of users booked to have a meeting in the room 6'. Room booking information may be displayed on the touch panel 16' and used to initiate a media streaming session upon receiving a user input via the controller interface e.g. to start the scheduled meeting.

The scheduling server 64 may comprise a Microsoft® Exchange Server or similar. In such arrangements, the scheduling server 64 may store calendar information for users, including the locations of scheduled meetings at any given time. This information may be input to a user's calendar using their end-user device 8' which is connected to the scheduling server 64 through an exchange network link 68, or by any other means known in the art per se.

The control server 20' is arranged to acquire data from the controller 14' via a network link 24'. This data now includes meeting information or a subset of such information, for example the expected participants for a meeting that is scheduled to take place in the room 6'. The controller 14' is arranged to push meeting information, e.g. room scheduling with participant information, to the control server 20'. The control server 20' can then create a database by aggregating meeting information from multiple controllers 14' in multiple rooms 6', without accessing individuals' calendars. The control server 20' is then able to predict where a user is intended to be. As the control server 20' is now provided with trusted information about the participants of a meeting in the room 6', there is no need to confirm proximity for a user of the end-user device 8' and the media streaming session may be initiated automatically without needing a second user input for confirmation.

For the system to work securely, it is a pre-condition that the user of the end-user device 8' has completed an authentication process, so that the control server 20' is sure of the user's identity before selecting the multimedia receiver device 10' from the list based on the meeting information sent from the controller 14'. The end-user device 8' may present a web page (such as www.easyconnect.cyviz.com) with a "login" function, which allows the user to enter credentials which are sent to the control server 20' for verification. The control server 20' then uses the external user catalogue 70, for example Microsoft® Active Directory, to actually verify the credentials. The control server 20' provides a link between the external user catalogue 70 and the meeting information originating from the scheduling server 64, so that the system 2' can use the same "user object" when attempting to match information from different sources i.e. the controller 14' and the end-user device 8'. The login credentials entered into the end-user device 8' and the user information provided by the external user catalogue 70 after a successful authentication may take the form of e.g. a unique user number, user email address, or Globally Unique Identifier (GUID), as is known in the art. The external user catalogue 70 has a user verification network link 72 with the control server 20' and a network link 74 with the scheduling server 64.

Optionally, the controller 14' may also push meeting participant information to the scheduling server 64 via the location information network link 66. For example, if a meeting were arranged between a number of users for a particular time but without a location being agreed, a host user may be able to log in to the controller 14' when they find a suitable location (e.g. a vacant conference room 6'). The controller 14' may then inform the scheduling server 64 that the host of the meeting (or, in some arrangements, a different user invited to the meeting) has logged into the controller 14' and thus the location for the meeting stored on the scheduling server 64 can be updated to reflect this. This updated meeting information may then be used in order to determine which multimedia receiver device(s) should be available to meeting participants. As the end-user device 8' is connected to the scheduling server 64 via the exchange network link 68, the user can be automatically presented an appropriate receiver 10' in the room 6' based on the updated meeting information. Again, user identity can be verified for the meeting participants based on information provided by the external user catalogue 70.

As the scheduling server 64 provides a trusted source of information as to the whereabouts of users, it may not be necessary in such arrangements to carry out any further confirmation steps (e.g. inputting access codes including OTA codes as described above), although these may of course still be carried out optionally if desired. Of course the meeting participant logged into the end-user device 8' does not have to be in the same room 6' as the other meeting participants. As the system 2' is network-centric, once the identity of the user has been verified, the media streaming session from the end-user device 8' to the receiver 10' can be initiated regardless of whether that user is physically present in the scheduled meeting. In some examples, this can enable screen sharing between remote locations while an audio link may be provided independently, for example using a telephone connection or web meeting e.g. Skype session.

In some examples, the meeting information could be combined with location information received by the control server 20', e.g. from a location system as described previously with reference to FIG. 1, in order to confirm that one or more of the intended participants are indeed present. In a similar way to that described above, the control server 20' needs to be able to match the location information received from a location system (e.g. location system 21 in FIG. 1) to the identity of the users of the end-user device 8' and controller 14'. Accordingly, in either of the embodiments seen in FIGS. 1 and 16, a location system 21 may be connected to the control server 20' and both may be connected to the same external user catalogue 70 to enable integration of location information in a way that uniquely identifies the same user across all information sources.

Thus it will be seen that a scalable system for streaming multimedia data that does not require dedicated software and can instead implement e.g. a web-based user interface through a web browser has been described herein. Although particular embodiments have been described in detail, it will be appreciated by those skilled in the art that many variations and modifications are possible using the principles of the invention set out herein.

The invention claimed is:

1. A system for streaming data comprising multimedia content, the system comprising:
    one or more controllers comprising a controller interface arranged to be connected to an end-user device via a first control network link;
    one or more multimedia receiver devices comprising a multimedia interface suitable for connection to a video reception device, wherein each of the one or more multimedia receiver device(s) is arranged to be connected to an associated controller via a second control network link and is further arranged to be directly connected to the end-user device via a simplex media streaming network link;
    a control server hosting a list of the one or more multimedia receiver device(s) and associated controller(s);
    wherein the end-user device comprises a user interface connected to the control server, said user interface being arranged for the selection of a multimedia receiver device from the list and the multimedia content to be streamed from the end-user device to the selected multimedia receiver device;
    wherein the end-user device and the controller associated with the selected multimedia receiver device are arranged to initiate a simplex media streaming session via the simplex media streaming network link between the end-user device and the selected multimedia receiver device upon receiving a user input via the controller interface or via the end-user device.

2. A system according to claim 1, wherein the user input comprises a first confirmation that the media streaming network link should be established with the selected multimedia receiver device.

3. A system according to claim 2, wherein the user interface enables the selection of the multimedia content to be streamed upon the first and/or second confirmation being entered.

4. A system according to claim 1, wherein the end-user device and the controller associated with the selected multimedia receiver device are arranged only to initiate the media streaming session upon a second confirmation being entered into the end-user device via the user interface.

5. A system according to claim 4, wherein the second confirmation is transmitted from the end-user device to the controller via the first control network link.

6. A system according to claim 4, wherein the second confirmation comprises an access code, optionally wherein the access code comprises a personal identification number (PIN) code.

7. A system according to claim 6, wherein the access code is generated by the control server, optionally wherein the system is arranged to display the access code via a display connected to the multimedia receiver or via the controller interface and/or wherein the list hosted by the control server comprises a list of current one-time authorisation (OTA) codes for each of the one or more multimedia receiver device(s) and associated controller(s).

8. A system according to claim 1, wherein the user interface comprises a standalone computer program that supports the WebRTC protocol.

9. A system according to claim 1, wherein the user interface comprises a web browser, optionally wherein the web browser is arranged to implement the initiated media streaming session using a web application hosted by the control server and/or the web browser is arranged to implement the initiated media streaming session using a Web Real-Time Communication (WebRTC) application programming interface (API).

10. A system according to claim 1, further comprising a third control network link between the end-user device and the selected multimedia receiver device, optionally wherein said third control network link is also established by the controller, via the first and second control network links.

11. A system according to claim 1, comprising a plurality of multimedia receiver devices each comprising a multimedia interface suitable for connection to a video reception device, wherein each multimedia receiver device has a dedicated media streaming network link to an end-user device.

12. A system according to claim 11, further comprising a matrix device comprising a plurality of multimedia interface inputs and at least one multimedia interface output, the matrix device being connected between the plurality of multimedia receiver devices and their associated controllers, wherein the matrix device is arranged to route media content streamed over each media streaming network link to the video reception device.

13. A system according to claim 12, wherein each of the plurality of multimedia receiver devices is arranged to send an incoming stream signal to its associated controller upon receiving streamed media content from an end-user device, and the associated controller is arranged to send a matrix switch signal to the matrix device upon receiving the incoming stream signal, wherein the matrix device is arranged to route media content streamed over each media streaming network link to the video reception device upon receiving the matrix switch signal, optionally wherein the matrix device is arranged to route media content streamed over a plurality of media streaming network links to a plurality of virtual windows displayed on the video reception device and/or wherein the matrix device is arranged to route media content streamed over a plurality of media streaming network links to different video reception devices.

14. A system according to claim 1, further comprising a user location system arranged to provide user location information to the control server, optionally wherein the selection of a multimedia receiver device from the list is carried out automatically at least partially based on the user location information and/or wherein the user location system is arranged to receive user location information from one or more beacons that can determine a user's physical location.

15. A system according to claim 14, wherein the control server is arranged to aggregate the location information with user information received from an external user catalogue.

16. A system according to claim 1, further comprising a scheduling server arranged to provide meeting information to a controller of the one or more controllers, optionally wherein the controller is arranged to pull meeting information from the scheduling server and/or wherein the controller is arranged to send meeting information to the control server via a network link, and/or wherein the control server is arranged to aggregate the meeting information with user information received from an external user catalogue.

17. A system according to claim 16, wherein the control server is arranged to aggregate the meeting information with the list of the one or more multimedia receiver device(s) and associated controller(s).

18. A system according to claim 16, wherein the selection of a multimedia receiver device from the list is carried out automatically at least partially based on the meeting information.

19. A system according to claim 16, wherein the one or more controllers are each connected to the scheduling server directly via a scheduling network link.

20. A method of streaming data comprising multimedia content from an end-user device having a user interface to a multimedia receiver device comprising a multimedia interface suitable for connection to a video reception device, the method comprising:
- connecting the user interface of the end-user device to a control server to access a list of one or more multimedia receiver device(s) and associated controller(s);
- selecting one or more multimedia receiver(s) from the list via the user interface;
- transmitting a stream request via a first control network link between the end-user device and a controller, having a controller interface, that is associated with the selected multimedia receiver device;
- receiving a user input via the controller interface or via the end-user device to accept the stream request;
- transmitting an initiation command from the controller to the selected multimedia receiver device(s) via a second control network link;
- selecting the multimedia content to be streamed from the end-user device to the selected multimedia receiver device via the user interface; and
- initiating a simplex media streaming session via a simplex media streaming network link between the end-user device and the selected multimedia receiver device(s).

* * * * *